United States Patent [19]

Morgan et al.

[11] 4,270,868
[45] Jun. 2, 1981

[54] DIGITAL PULSE-WIDTH MODULATED PRINTER ESCAPEMENT CONTROL SYSTEM

[75] Inventors: David B. Morgan; Robert F. Pan; Paul A. Quinn, Jr.; Glenn S. Westerman, all of Lexington, Ky.

[73] Assignee: International Business Machines Corporation, Armonk, N.Y.

[21] Appl. No.: 954,374

[22] Filed: Oct. 24, 1978

[51] Int. Cl.³ .............................................. B41J 19/00
[52] U.S. Cl. .................................. 400/320; 400/279; 318/341; 318/599
[58] Field of Search ................. 400/76, 120, 124, 126, 400/279, 280, 281, 320, 322, 323, 328, 705.1; 346/1, 75, 76 R, 76 L, 76 PH, 139 B, 139 D; 318/341, 599, 594, 601, 603; 250/237 G

[56] References Cited

U.S. PATENT DOCUMENTS

| | | | |
|---|---|---|---|
| 3,213,343 | 10/1965 | Sheheen | 318/341 |
| 3,416,052 | 12/1968 | Russell et al. | 318/599 |
| 3,539,895 | 11/1970 | McGee | 318/603 X |
| 3,596,275 | 7/1971 | Sweet | 346/1 |
| 3,723,842 | 3/1973 | Sather | 318/601 X |
| 3,742,326 | 6/1973 | Okuda et al. | 318/603 |
| 3,831,728 | 8/1974 | Woods et al. | 400/126 X |
| 3,843,914 | 10/1974 | Carlson et al. | 318/341 X |
| 3,883,786 | 5/1975 | McNaughton et al. | 318/341 X |
| 3,950,685 | 4/1976 | Kramer | 400/328 X |
| 4,006,391 | 2/1977 | Deering et al. | 318/599 X |
| 4,024,447 | 5/1977 | Epstein | 400/120 X |
| 4,034,842 | 7/1977 | Giacone | 400/322 X |
| 4,114,750 | 9/1978 | Baeck et al. | 400/323 X |
| 4,118,129 | 10/1978 | Grundherr | 400/320 X |
| 4,138,632 | 2/1979 | Pauwels et al. | 318/599 |
| 4,143,310 | 3/1979 | Fujinawa et al. | 318/603 X |
| 4,146,922 | 3/1979 | Brown et al. | 318/599 X |
| 4,147,967 | 4/1979 | Aiena | 318/341 |
| 4,180,703 | 12/1979 | Cialone et al. | 250/237 G |
| 4,180,704 | 12/1979 | Pettit | 250/237 G |

OTHER PUBLICATIONS

IEEE Transactions on Industrial Electronics and Control Instrumentation, vol. IECI-23, No. 1, Feb. 1976, pp. 44-46.
IEEE Transactions on Industrial Electronics and Control Instrumentation, "A High Performance Position Control" By R. Tickell, vol. IECI-14, No. 1, Apr. 1967, pp. 27-33.

Primary Examiner—Ernest T. Wright, Jr.
Attorney, Agent, or Firm—William J. Dick

[57] ABSTRACT

Disclosed is a digital escapement control system in which the motor (DC) control is completely digital requiring no tachometer generation of feed back signal nor any analog to digital convertors. Connected to the DC motor shaft is a code wheel and detector to determine the time between discreet positions of the motor shaft as it rotates. The time between discreet positions is then compared with a desired time, and the difference is stored, as by a register. The difference is then converted to a pulse-width-modulated (PWM) signal which directly controls the rotational velocity of the motor, increasing or decreasing it as necessary. The system operates, in a ramp, open loop start up mode and digital velocity controlled braking mode while in the motional mode with the feed back as described above. At start up, provision is made for inserting the feed back loop when the velocity reaches some predetermined level or percentage of the desired velocity.

21 Claims, 26 Drawing Figures

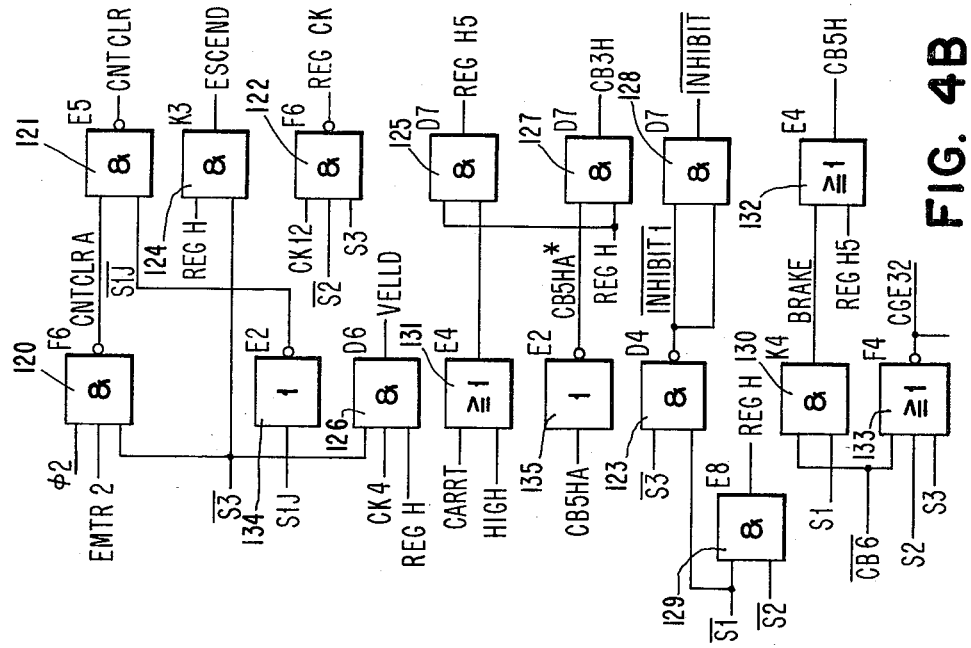
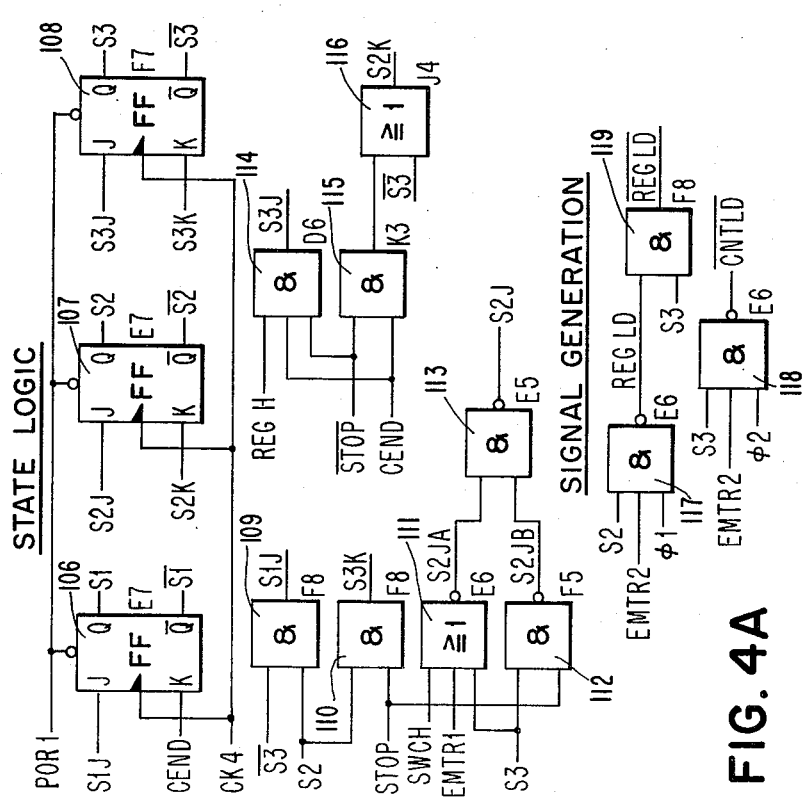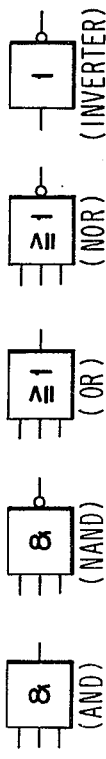
FIG. 4A
FIG. 4B

FIG. 18

|   | A | B | C | D | E | F |
|---|---|---|---|---|---|---|
| 1 | RES 2K 16 PIN | SW 14 PIN | 74153 | 74193 | 7400 | 74193 |
| 2 | RES 2K 16 PIN | SW 14 PIN | 74153 | 74193 | 7404 | 74193 |
| 3 |  | SW 14 PIN | 74153 | 7430 | 7408 | 7408 |
| 4 |  | SW 14 PIN | 74153 | 7400 | 7432 | 7427 |

|   | H | J | K | L | M | N |
|---|---|---|---|---|---|---|
| 1 | 74L85 | 74193 | 74193 | 100MHz OSC | 7407 | 8203A |
| 2 | 74L85 | 74193 |  |  |  | D44E2 |
| 3 | 7404 | 74193 | 7408 |  |  | A115D |
| 4 | 7407 | 7432 | 7408 |  |  | 2N2904 |

|   | A | B | C | D | E | F |
|---|---|---|---|---|---|---|
| 5 | INPUT OUTPUT PRINTER | 7410 |  | 10k, 150Ω, 10 ufd | 7400 | 7420 |
| 6 | 7408 | 74107 |  | 7411 | 7410 | 7410 |
| 7 | 74107 | 74107 |  | 7408 | 74107 | 74107 |
| 8 | 7404 | 7408 | -5 INPUT | 7400 | 7408 | 7408 |

|   | INPUT (FROM CONTRLR) | RES 2K 16 PIN |   |   |
|---|---|---|---|---|
|   |  | 7400 |  |  |
|   |  | 7400 |  |  |
|   |  | 7400 |  |  |

DIGITAL PULSE-WIDTH MODULATED PRINTER ESCAPEMENT CONTROL SYSTEM

SUMMARY OF THE INVENTION

The present invention relates to an escapement control system for printers, and more particularly relates to digital drive control system for printers employing a DC motor in which the motor speed control is completely digital for conversion to pulse-width-modulated (PWM) signals for directly controlling the rotational velocity of the motor.

There are numerous prior art systems for controlling the velocity of relative movement between the printing elements and the print receiving media on printers (for purposes of this application, printers include typewriters which are nothing more than interactive printers). In all of these systems, it is mandatory that the speed of relative movement between the printing elements and the print receiving media be closely controlled in order that printing occur on the printing medium at the precise location desired. In certain systems, such as a simple typewriter, the position of the carrier (or carriage) relative to the implements of printing is more readily accessible simply through an encoding wheel on a shaft attached to the motor drive. In other systems, such as an ink jet printer or interactive ink jet printer, the control system must, of necessity, be more complex. For example, in an ink jet type printer, before printing may occur it is desirable that the carrier associated with the ink jet reach a predetermined speed prior to the start of scan (start of print) signal in a Sweet type printing system. In other systems, the control of printing and the appearance of the print on the printing medium is enhanced when the drive system is maintained as closely as possible and correlated with the actual energization of and printing by the printer. In the prior art systems, motor speed controls typically employ a tachometer which is driven by the motor, the tachometer may output an analog signal which may be employed in a feed back circuit to maintain the motor at a constant speed. Alternatively, the motor speed control may employ an encoder wheel, the pulse output of which is applied to a digital to analog convertor which applies the analog voltage obtained to a motor drive circuit to raise or lower the speed of the motor. Typical prior art systems for motor control may be found in the following references.

1. U.S. Pat. No. 3,539,895, McGee (utilizes a resolver for sensing and not a digital encoder, employs an analog drive, not a switching drive for the motor; and is primarily a position control not a velocity control).
2. U.S. Pat. No. 3,416,052, Russell; (illustrates a pulse width modulated (PWM) position control circuit, in essence an analog PWM circuit which uses positive or pressure control feed back, a solenoid and not a motor control);
3. U.S. Pat. No. 3,723,842, Sather; (relates to a digital servo motor control with an error rate derivative circuit, a "sample" data control system, a serial realization of a type 1 typically digital control system except that the output is the sign of the overflow only. Sather employs a position control not a velocity control; the position coder is 16 phase not single phase; the drive output is not described but probably analog for a simple on-off type control).
4. U.S. Pat. No. 4,006,391, Dearing; (relates to a linearized pulse width modulator which employs an H drive for switching purposes for a two phase AC motor, not a DC motor; Dearing appears to be an analog logic for PWM conversion);
5. U.S. Pat. No. 3,742,326, Okuda; (this patent relates to a digital servo mechanism which employs digital information to obtain a pulse width modulated signal for driving a two phase AC servo motor, not a DC servo motor and the velocity control is different because of the type of control that is applied to the AC motor, see particularly FIG. 8).

In view of the above, it is a principle object of the present invention to accurately control the velocity of the motor in a printer by digital circuitry and to enable direct conversion of a digital signal to a pulse width modulation technique for driving a DC motor.

Another object of the present invention is to provide a printer escapement control system in which the optimum desired velocity may be attained quickly with minimum oscillation about the predetermined motor velocity while enabling a simple and yet effective control for shifting the speed of the printer or change in carrier motion.

Yet another object of the present invention is to provide a printer escapement control system which may be employed in various types of printers including interactive printers, but in which the essential elements of the control system may be purchased inexpensively.

Other objects and a more complete understanding of the invention may be had by referring to the following specification and claims taken in conjunction with the following drawing in which:

DESCRIPTION OF DRAWING

FIGS. 4A-4D show the actual logic circuitry employed in the sequence controller A;

FIG. 18 is a chart giving typical devices and values which may be employed in the circuit diagrams illustrated from FIG. 3–FIG. 17.

DETAILED DESCRIPTION

Figure 1A:
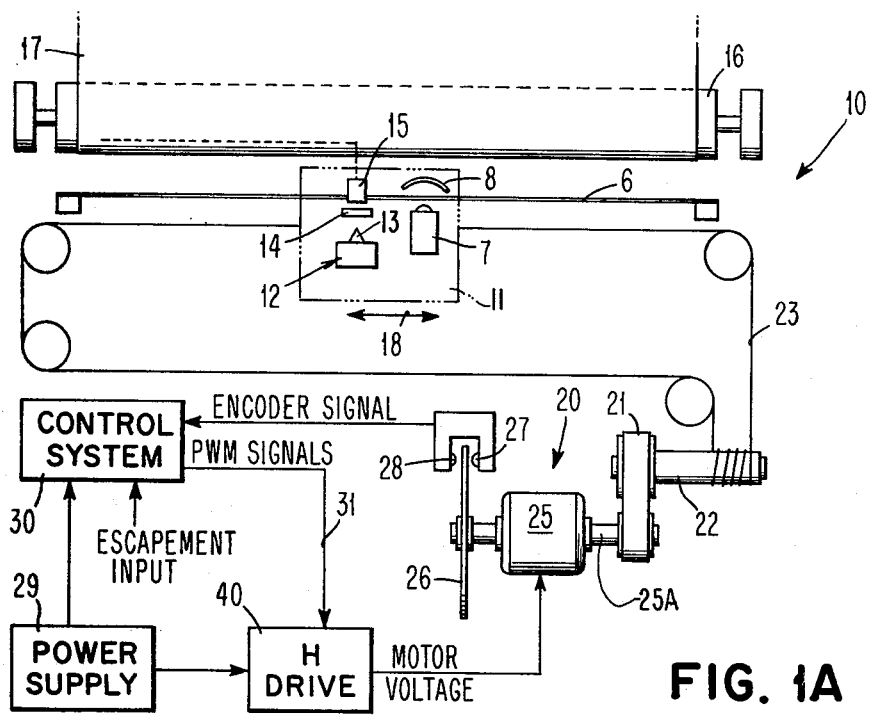
FIG. 1A illustrates schematically an example printer incorporating, in block diagram form, a printer escapement control system constructed in accordance with the present invention.

Referring now to the drawing, and especially FIG. 1A thereof, a typical printer 10, in the present instance a continuous sweep or on the fly printer such as an ink jet printer employing the well known Sweet process such as illustrated in U.S. Pat. No. 3,596,275 to Richard G. Sweet, is illustrated therein. At the outset, it should be recognized that the printer escapement control system of the present invention may be employed with a variety of printers of both the impact and non-impact type and independent of whether the printers are interactive or non-interactive. As illustrated, the printer 10 includes a carrier or the like 11 upon which the implements of printing 12 are mounted, the printing implements 12 including for example a nozzle 13 which emits a stream of ink which due to pressure perturbations is broken up into individual droplets which pass through a charge electrode or the like 14 and then pass between deflection electrodes 15 to impinge upon print receiving media or means, in the illustrated instance a platen 16 and paper 17. Means are provided for effecting relative motion between the carrier 11 and the print receiving media, in the illustrated instance the carrier 11 being movable in the direction of the arrow 18 as by drive means 20. The drive means 20 preferably includes a DC motor or the like 25 which may be coupled in any convenient manner to the carrier 11 to effect displacement of the carrier 11 relative to the print receiving means (16,17). In the illustrated instance, the DC motor 25 is connected through its shaft 25A and a timing belt or the like 21 to a cable wound drum 22 having several turns of cable 23 thereon which are connected to opposite sides of the carrier 11 so that motor rotation, depending upon direction, will effect the carrier motion in the direction of the arrow 18. In the printer 10 illustrated in FIG. 1A, it is mandatory, for insuring that the location of the carrier 11 is correct relative to start of print, as well as the direction of movement of the carrier 11 relative to the print receiving medium or paper 17, that means be provided for locating the carrier 11 at any time during its movement in the direction of the arrow 18. To this end, a grating or the like 6 may be employed in conjunction with a light emitting and detection module or sensor 7 including a mirror 8 to permit both a position indicating control for the carrier 11 and a direction of movement control for the carrier 11. Such a complete system is illustrated and described in patent applications Ser. No. 920,305, filed on June 28, 1978 and entitled "Bi-directional Self Imaging Grating Detection Apparatus", inventor D. R. Cialone, et al, now U.S. Pat. No. 4,180,703, issued Dec. 25, 1979 and in Ser. No. 920,306, filed also on June 28, 1978 and entitled "Detection Circuit for A Bi-directional, Self Imaging Grating Detection Apparatus", inventor J. W. Pettit, now U.S. Pat. No. 4,180,704, issued Dec. 25, 1979, both applications being assigned to the assignee of the present application, and both applications being herein incorporated by reference.

If the drive system 20 motor is directly connected to a carrier 11 so as to permit motion for velocity information to also be read from the movement of the sensor 7 past the grating 6, a single detection means may be employed. However, such a direct drive system still has problems relative to the inertia of the carrier 11, and when the motor 25 is separated from the carrier 11 as by the drive scheme illustrated herein, a separate encoding system must be employed in order to derive the necessary information to feed back to the motor 25 to permit, in conjunction with the position and direction information taken from the grating 6, accurate control of motor velocity which is related of course to the velocity of the carrier 11.

BACKGROUND CONSIDERATIONS OF THE PRINTERS ESCAPEMENT CONTROL SYSTEM

In designing a velocity control system for a low cost print-on-the fly typewriter/printer, good velocity control around an operating velocity and low cost become the principle objectives. In order to implement good velocity control and low cost, the velocity control objective implies a velocity feedback control system while a low cost objective directs a designer towards a simple digital sensing, control and drive scheme. Thus the key to a successful operating printer escapement is in essence its control system.

A control system of the present invention comprises three major functions: (1) determining the motor's velocity, (2) determining the required motor voltage to obtain the desired motor velocity, and (3) generating the motor voltage drive signal, in the present instance a pulse width modulated (PWM) drive signal.

In a typical system, motor velocity may be found utilizing an encoder wheel such as the wheel 26 illustrated in FIG. 1A, the wheel 26 having a plurality of slots adjacent its periphery, the slotted portion passing between an encoder, such as a light emitting diode or transistor 27 and a phototransistor and amplifier 28 so that a pulse is emitted by the phototransistor 28 upon the passage of a slot between the light emitting diode 27 and the phototransistor 28 by rotation of the motor 25 and thus the encoder wheel 26.

In a typical system, the motor velocity may be found by first recording the time $\Delta t$ between the encoder pulses. The distance $\Delta x$ between adjacent slots on the encoder wheel 26 which are represented by the encoder pulses is of course set by the encoder wheel 26 design. In this manner, the velocity of the motor 25 may be calculated by $V = \Delta x / \Delta t$. Conventionally, the function $\Delta x / \Delta t$ may be calculated by a processor if the pulse rate is slow enough, or by combinational logic. If a processor is employed, the calculation is difficult and relatively slow. If the function $\Delta x / \Delta t$ is found by combinational logic, a large combinational logic function is called for. (Implementation of a $1/\Delta t$ in combinational logic requires large amounts of complex logic circuitry). After the motor velocity is measured, the required motor voltage, to obtain the desired velocity, must be calculated. In a type 0 system, which is preferred because of its stability and simplicity, a voltage is applied to the motor 25 which is directly proportional to the difference between the motor velocity and the desired velocity. This function is given by $$EM = K(V_O - V) + E_{mb} \quad (1)$$

or $$EM = KV_O\left(1 - \frac{V}{V_O}\right)$$

where EM = Motor voltage
K = Gain factor
$V_0$ = Desired velocity
V = Present velocity
Emb = Bias voltage [obviously when $V_0 = V$, EM would equal 0, and if no bias voltage were applied the motor 25 would stop. Accordingly, in the following equations, Emb has been dropped out].

The control system of the present invention condenses to the following parts: (1) Implementing the $EM = K(V_0 - V)$ function with simple logic and (2) generating a pulse width modulation driver signal from the value of the motor voltage (EM) by a simple logic function without any analog circuitry.

Inasmuch, as has already been explained, the implementation by calculating $V = \Delta x/\Delta t$ is difficult, the problem of implementing the $EM = K(V_0 - V)$ function is accomplished by using a non-linear approximation around the operating point of $V_0$. By utilizing at a non-linear approximation, implementation of that approximation simplifies greatly the logic necessary to create the control system. The approximation is as follows:

$$EM' = K'(\Delta t - \Delta t_0) \quad (2)$$

where EM' = Motor voltage
K' = New gain constant
$\Delta t$ = Time between encoder pulses (actual)
$\Delta t_0$ = Time between encoder pulses desired
$\Delta x$ = Distance between adjacent windows on encoder wheel 26

Proof of validity of approximation: Given that $V_0 = \Delta x/\Delta t_0$ and $V = \Delta x/\Delta t$, then:

$$EM' = K'(\Delta x/V - \Delta x/V_0) \quad (3)$$

$$EM' = K'(\Delta x/V_0)[\Delta x/V \times V_0/\Delta x - \Delta x/V_0 \times V_0/\Delta x]$$

$$EM' = K'(\Delta x/V_0)[V_0/V - 1] \text{ and since } \Delta x/V_0 = \Delta t_0$$

then $$EM' = K' \Delta t_0 (V_0/V - 1)$$

Figure 1B:
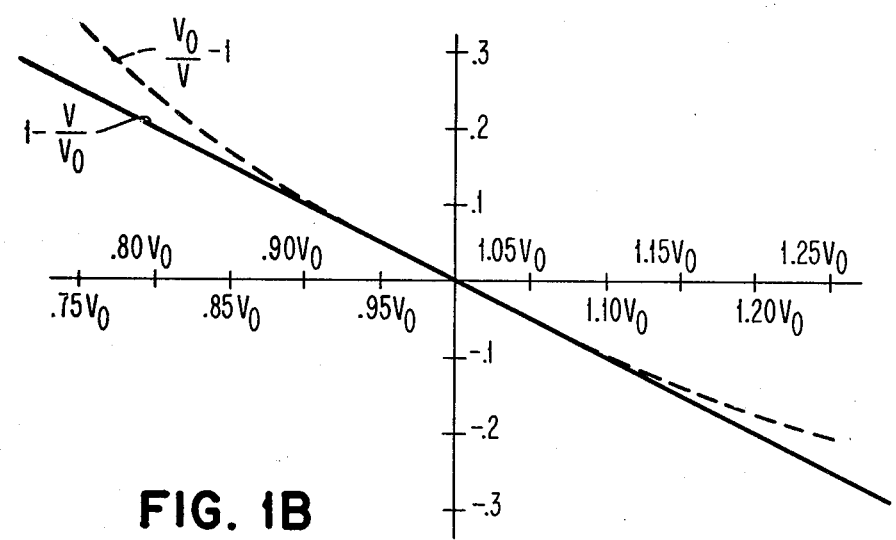
FIG. 1B is a graph illustrating the actual versus the approximate (or approximation) underlying the simple implementation of the printer escapement control system of the present invention.

Thus when $V_0 = V$, $EM = EM'$ therefore setting $K(V_0) = K' \Delta t_0$ makes a good approximation for $EM' = EM$. The plot in FIG. 1B shows the approximation plotted, i.e., $V_0/V - 1$ as approximating EM' and $1 - V/V_0 = EM$.

Thus the approximation of $K'(\Delta t - \Delta t_0)$ may be considered a valid approximation of $K(V_0 - V)$.

Utilizing the approximation, and in accordance with the invention, a very simple logic function enables the difference between the actual time between encoder pulses to be compared with the desired time between the encoder pulses and then the difference used to create a pulse width modulated signal to be applied to the drive circuitry for controlling the motor voltage, and thus the motor speed. As shown in FIG. 1A, the encoder signal is fed to the control system logic 30, which is appropriately powered as by a power supply 29, and the signal output from the control system logic 30 is a pulse width modulated (PWM) signal at the output line 31, which is applied to the drive electronics 40. The implementation of the approximation equation and conversion to a pulse width modulated (PWM) signal is elegantly simple.

Figure 2:
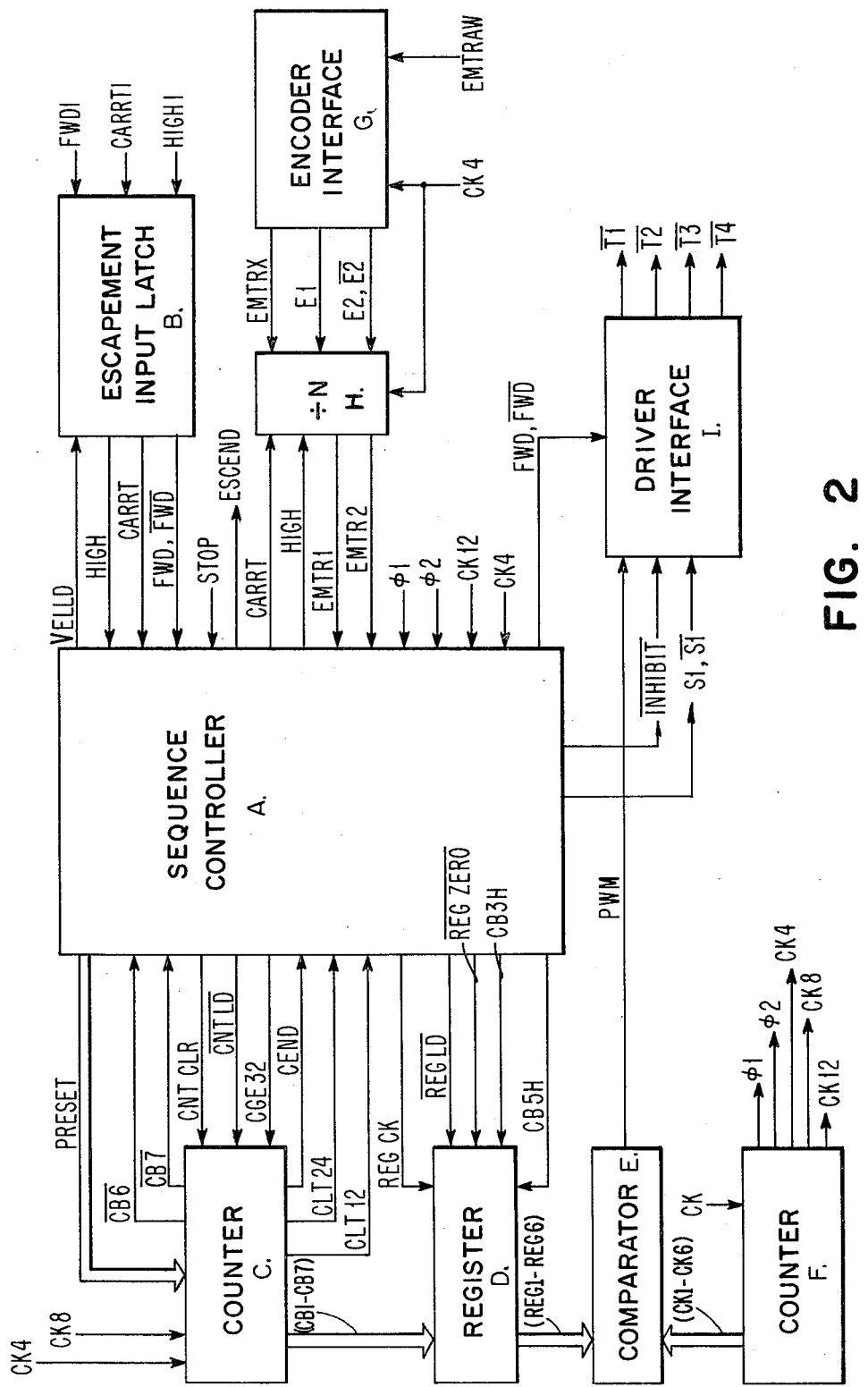
FIG. 2 is a block diagram of the control system of the present invention and illustrating the various signals in mnemonic form.

In accordance with the invention, and referring briefly to FIG. 2, the counter C is preset with $-\Delta t_0$, and counting is commenced in the counter C when an encoder pulse is received. The EM' value ($\Delta t - \Delta t_0$) which will be in the counter C is placed into the register D upon receipt of the next encoder pulse. The logic function employed to accomplish generation of a pulse width modulated driver signal from the stored (in register D) EM' value comprises a greater than comparator E and a free running counter F.

Assuming a simple clock signal CK of 1.25 MHz input into the counter F, and a reset to 0 approximately every 50 microseconds (which means the generation of a 19.53 KHz driver signal i.e., 1.25 MHz divided by $CK6 = 1.25$ MHz divided by $2^6 = 19.53$ KHz; reset therefore at $1/19.53 = 51.2\mu$ sec.), the counter F may count, for example, 0 to 63 and then reset to 0. By way of example, if the stored EM' value is 8, then the stored EM value is "greater than" the free running counter 8 counts of the total 64 counts. The duty cycle of the "greater than" signal therefore is 1 divided 8. While the period of the signal is always fixed (1 divided by 20,000 in this example), the duty cycle is proportional to the value of EM. This accomplishes the pulse width modulated (PWM) output all in a simple logic function without employing any analog circuitry.

SPECIFIC EMBODIMENT

Figure 3:
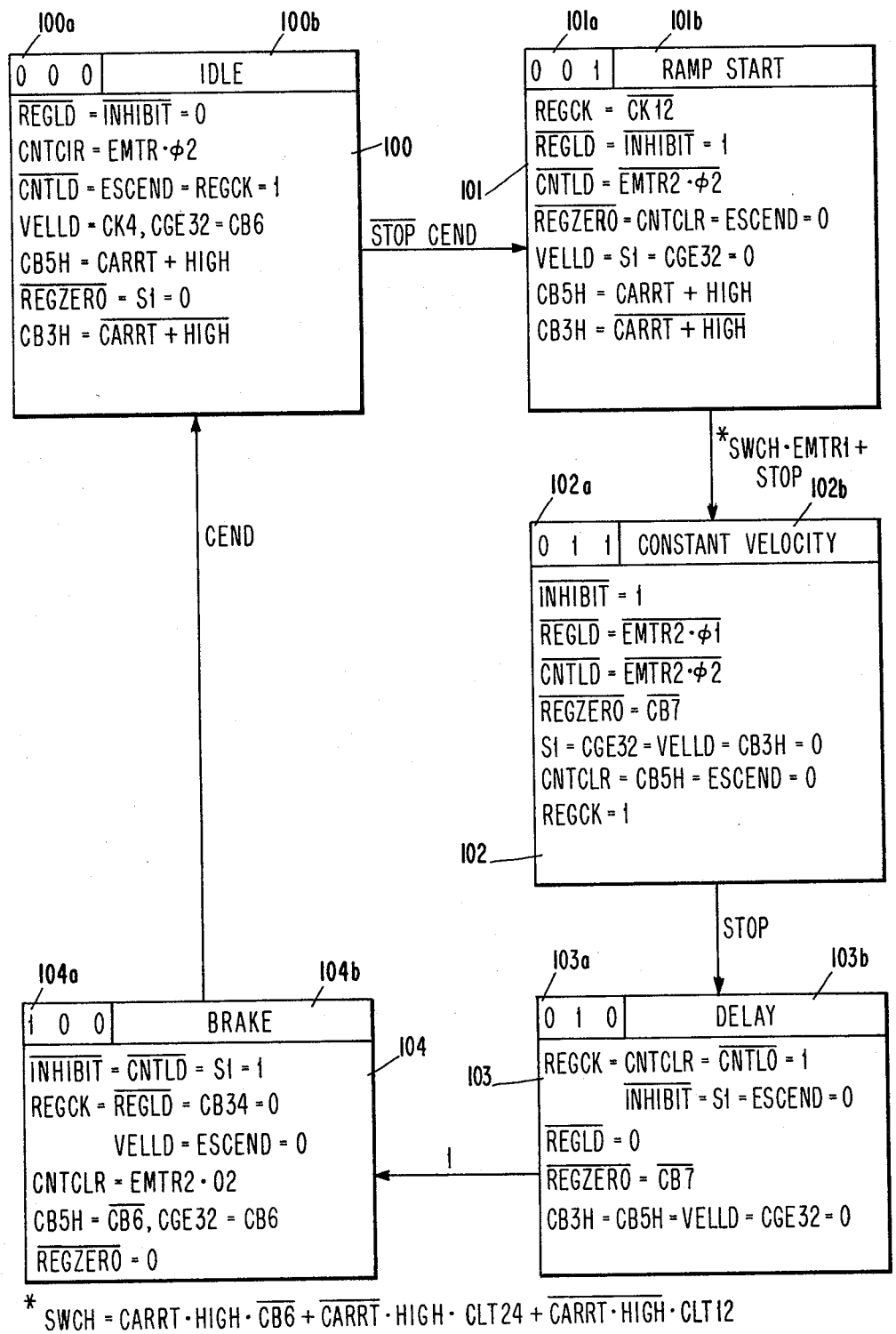
FIG. 3 is a sequence controller state (sequential logic) diagram illustrating the logic equations employed in constructing a sequence controller A such as illustrated in FIG. 2.

The control system, which is the heart of the approximate non-linear digital velocity control system, and the circuitry employed therein is illustrated in FIG. 2 et seq. Inasmuch as the diagrams are complete, a mnemonic glossary signal designation is employed to illustrate the various signals which act as inputs and outputs from each of the blocks schematically shown and representative of logic in FIG. 2. For example, and referring to FIG. 2, the state diagram for the sequence controller A is illustrated in FIG. 3, while FIGS. 4A-4D illustrate the logic incorporated within the sequence controller A. In a like manner, the escapement input latch B, the counter C, the register D, the comparator E, the counter F, the encoder interface G, the divide by N counter H and the driver interface I which leads to the drive electronics 40 (FIG. 1) are shown serially in the remaining Figures, starting with FIG. 5. Inasmuch as each of the functional blocks indicated in FIG. 2 have both inputs and outputs which have been mnemonically designated, a mnemonic glossary of both inputs and outputs follows, many of the inputs and outputs being indicated with respect to each of the functional blocks A through I so that any one of the blocks may be examined individually for its inputs and its outputs. For example, the sequence controller A has an input CARRT from the escapement input latch B, as well as having an output VELLD to the latch B. Thus under sequence controller A, CARRT is designated as an input while VELLD is indicated as an output. However, in the escapement input latch B mnemonic glossary, VELLD is indicated as an input, while CARRT is indicated as an output. In this manner, the glossary may be used not only to indicate the signal input and output condition description, but each of the functional blocks A through I may be examined independently and collectively. Additionally, and by way of explanation with regard to the glossary and the circuitry illustrated, depending upon the escapement input to the escapement input latch B, the signal setup is for three approximate speeds of the carrier 11, speed I ($V_0$) approximately 12 cm/second, speed II ($V_1$) approximately 25 cm/second; and speed III approximately 53 cm/second. Additionally, certain definitions are more complete with respect to certain of the logic blocks, especially where the meaning must be amplified for reader understanding. For example see mnemonics CEND, CLT 24, CLT 12 in the sequence controller A input definitions and the same mnemonics in counter C output definitions.

Mnemonic Glossary

SEQUENCE CONTROLLER: (A)

Inputs:
1. FWD, $\overline{FWD}$: Direction latch output
2. CARRT, HIGH: Velocity latch outputs (V0, V1) (carrier right)
3. STOP: Escapement start, stop
4. CEND: From counter C, a decode signal
5. CLT 24: Counter C switch decode for speed II ($V_1$=25 cm/sec.)
6. CLT 12: Counter C switch decode for speed I ($V_0$=12 cm/sec.)
7. $\overline{CB6}$: Counter C switch decode for speed III (53 cm/sec) and the less-than 32 decode
8. $\overline{CB7}$: Output low when counter C is less than zero
9. CK4: System clock
10. $\phi1$: First phase of system clock
11. $\phi2$: Second phase of system clock
12. CK12: Clock ramp start timer
13. EMTR 1: Encoder signal
14. EMTR 2: Second encoder signal Outputs:
1. ESCEND: Indicates end of escapement
*2. CARRT, High: Selects "divide by" for encoder logic
3. FWD, $\overline{FWD}$: Forward and reverse direction (left to right, right to left), operation
4. $\overline{INHBIT}$: When low, turn off all transistors in H-drive (40)
5. SI, $\overline{SI}$: Indicates the stop mode
6. REG.CK: Increments the D register
7. $\overline{REGLD}$: Loads register D when low
8. REG.ZERO: Causes register D load to be zero when low
9. CB3H: Allows register load to be set to 4
10. CB5H: Allows register load to be set to 16
*11. PRESET: Counter C preset value (7 bits; ICB-1-ICB7)
12. CNTCLR: Clears counter C
13. $\overline{CNTLD}$: Loads counter C when low
14. CGE 32: Alters time increment on counter C
15. VELLD: Causes latch (B) to store next escapement function

| *PRESET: | CARRT, HIGH | ÷N | PRESET NUMBER |
|---|---|---|---|
| | 00 | 1 | −48 (12cm/sec.) |
| | 01 | 2 | −40 (25cm/sec.) |
| | 11 | 4 | −28 (53cm/sec.) |

ESCAPEMENT INPUT LATCH: (B)

Inputs:
1. FWD I=Direction
   1=Forward direction (left to right) required
   0=Reverse direction (right to left) required
2. CARRT I, HIGH I: Velocity data (V0, V1)
   00=12 cm/sec.
   01=25 cm/sec.
   11=53 cm/sec.
   10=Not valid
3. VELLD:
   1=Store FWD I, CARRT I and HIGH I in input latch B
   0=Maintain stored values Outputs:
1. FWD, $\overline{FWD}$: Direction latch output
2. CARRT, HIGH: Velocity latch output

COUNTER: (C)

Input:
1. PRESET: A 7 bit input which represents $-\Delta T_O$ with following numbering system. (ICB1, ICB2 . . . ICB7)

| Hex Input | Counter Value |
|---|---|
| 3F | +63 |
| 00 | 0 |
| 7F | −1 |
| 40 | −64 |

2. CNTCLR: Clears counter C
3. CNTLD: Loads counter C with PRESET values when low
4. CGE 32: Switches clock to slower clock rate when counter C is greater than 32, and the control system 30 is in stop mode.
5. CK4: System clock
6. CK8: Another clock pulse (slower)

Output:
1. $\overline{CB7}$: Low output when counter C less than 0
2. $\overline{CB6}$: (Decode 1) is high when counter C is less than 32. During the "stop mode" value=$t_{on}$, example 0.4096 m sec. (32×12.8$\mu$ sec.) Also used for speed V2.
3. CEND: (Decode 2) high when counter C value latches at $3F_{16}$. During "stop mode", =$t_{final}$ which is 6.96 m sec. (Note that in "stop mode" a slower clock (CK8) is used when counter value between 32 and 63)
4. CLT 24: High when counter C value less than 24 (used for speed V1)
5. CLT 12: High when counter C value less than 12 (this means that time between emitter pulses is less than (preset value +12) times 12.8$\mu$ sec.) Used for speed $V_0$
6. Counter Value Signals: (CB1 . . . CB7) value in counter C

REGISTER: (D)

Inputs:
1. Counter C value signals: (CB1 . . . CB7) value in counter C
2. $\overline{REGLD}$: Loads register D with a value when low
3. REGCK: Increments register D by clock signal, i.e., once every 3.28 m sec.

4. REG. ZERO: Loading value of register D is set low unless CB3H or CB5H are high
5. CB3H: When REG. ZERO is high, loading value of register D is 4. Used with ramp start upon speed $V_0$
6. CB5H: When REG. ZERO is high, loading value of register D is 16. Used with ramp start up on speed $V_1$ and $V_2$ Outputs:
1. REGISTER VALUE: Register 1 ... Register 6, output voltage (REG 1 ... REG 6)

COMPARATOR: (E)

Inputs:
1. REGISTER D Value: (Reg. 1 ... Reg. 6) voltage output from REGISTER D
2. COUNTER F Value: (CK1 ... CK6) free running counter or clock generator Outputs:
1. PWM: In example, a 19.53 KHZ pulse width modulated signal with a duty cycle proportional to the value of REGISTER D value

COUNTER: (F)

Inputs:
1. CK: In example given, a 1.25 MHz clock

Outputs:
1. COUNTER F Clocks: (CK1–CK6, CK8, ... CK12, $\phi1$, $\phi2$) output from a 12 bit free running counter. Clocks CK1 to CK6 are employed for the generation of PWM signals. Clocks CK4 and CK8 are counter C clocks. Clock CK4 is system clock for sequence controller A. CK12 clock is used to increment REGISTER D during ramp start. The frequency of the CK designated clock signals is 1.25 MHz/CKN i.e., frequency of clock signal $CK4 = 1.25/2^4 = 78.125$ KHz.

ENCODER INTERFACE: (G)

Inputs:
1. EMTRAW: Signal input from motor encoder 26
2. CK4: System clock

Outputs:
1. EMTRX: Generated as function of EMTRAW to allow a divide-by function by ÷N logic H, i.e., acts as a sequencing signal for ÷N
2. E1: A two clock pulse wide pulse at front of each EMTRAW
3. E2, $\overline{E2}$: Pulse signal allowing separation of E1 pulse into different phase pulses.

DIVIDE-BY-N: (H)

Inputs:
1. EMTRX: Sequences "divide-by" logic
2. E1: Used to generate EMTR1 and EMTR2
3. E2, $\overline{E2}$: To separate EMTR1 and EMTR2
4. CARRT, HIGH: Bit signal which causes divide by N—defined by

| CARRT, HIGH | N |
|---|---|
| 00 | 1 |
| 01 | 2 |
| 11 | 4 |

CK4: —System clock
Outputs:

1. EMTR1: First portion of the front or leading edge of the encoder signal; used for testing for switching from "ramp start" to "velocity control"
2. EMTR2: Second part of the front edge of the encoder signal; used to generate counter C and REGLD sequence

DRIVER INTERFACE: (I)

Inputs:
1. FWD, $\overline{FWD}$: Forward and reverse motor operation
2. $\overline{INHIBIT}$: When low, all drive transistors in H-drive 40 are turned off
3. S1, $\overline{S1}$: Stop mode
4. PWM: Duty cycle for switching the H-drive 40 at 19.53 KHz Outputs:
1. $\overline{T1}$, $\overline{T2}$, $\overline{T2}$, $\overline{T4}$: Four transistor drive signals for H-drive 40

While the generation and function of each of the signals and their operation in the control system 30 are straight forward and obvious when viewed from FIG. 2 et seq, the operation of the control system 30 to maintain a predetermined speed of the carrier 11 is briefly described below.

Figure 6A:
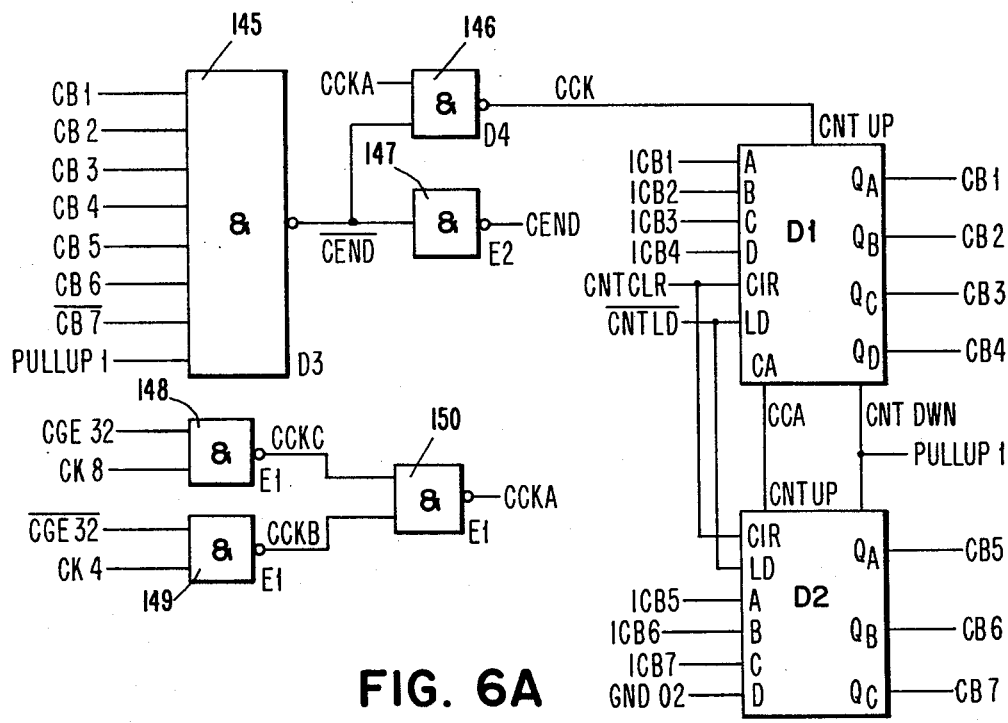
FIGS. 6A and 6B are schematic diagrams illustrating the circuitry employed to form the counter C illustrated in FIG. 2.
Figure 6B:
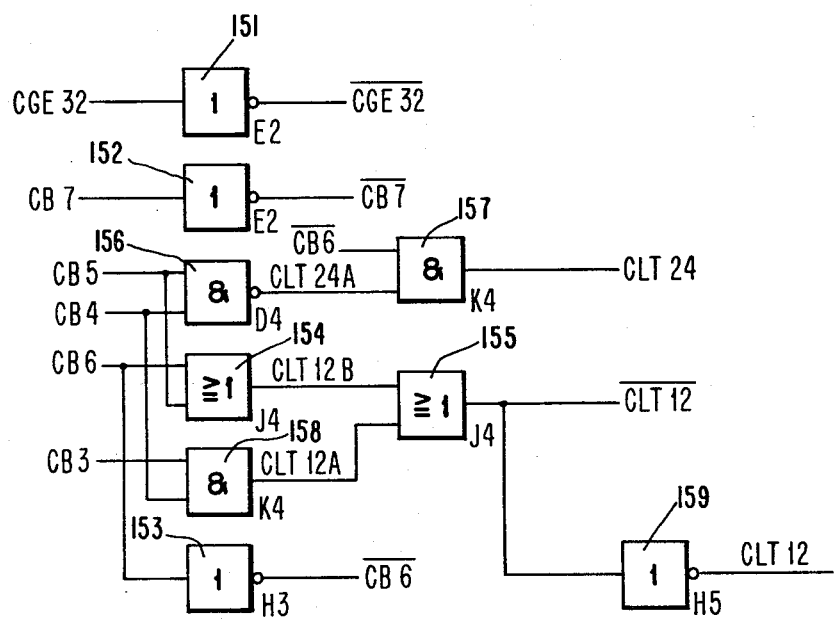
Figure 7:
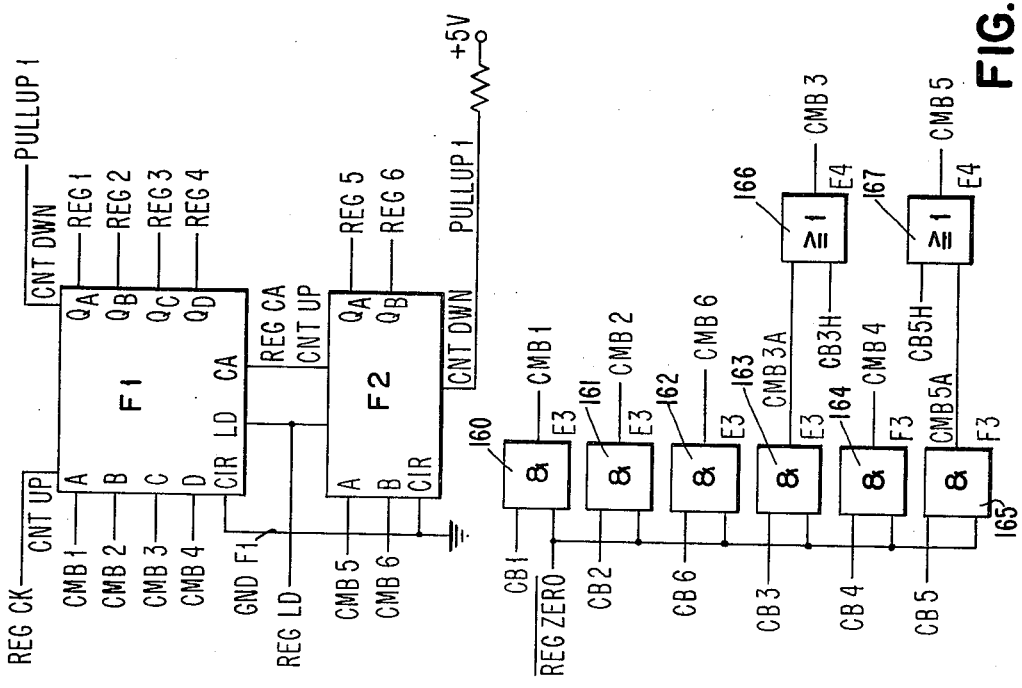
FIG. 7 is a schematic diagram of the circuitry employed to make the register D illustrated in FIG. 2.
Figure 15A:
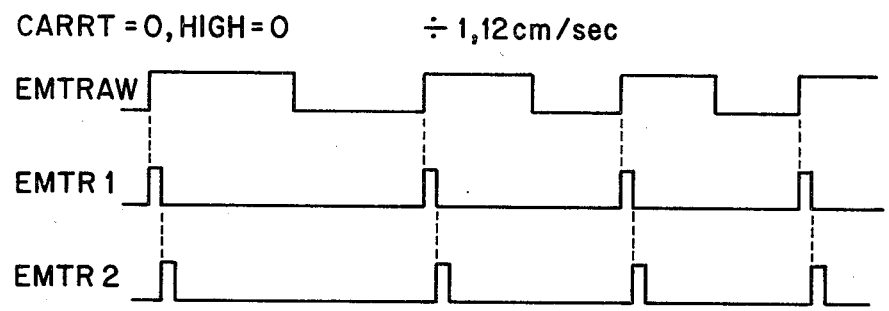
FIGS. 15A-15C are the encoder interface G and ÷N logic timing diagrams illustrating, by way of example, three possible speeds.
Figure 15B:
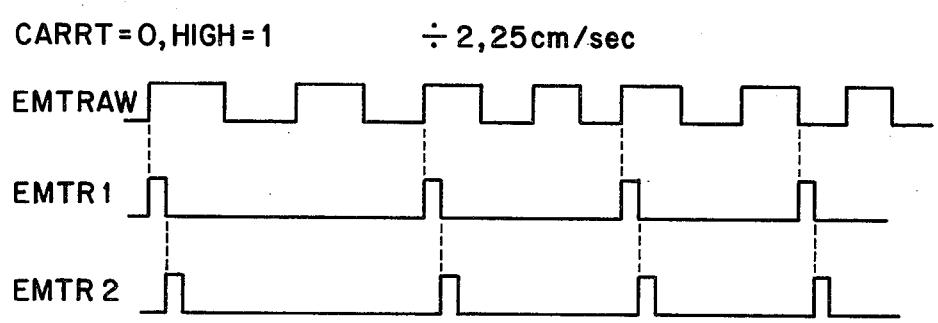
Figure 15C:
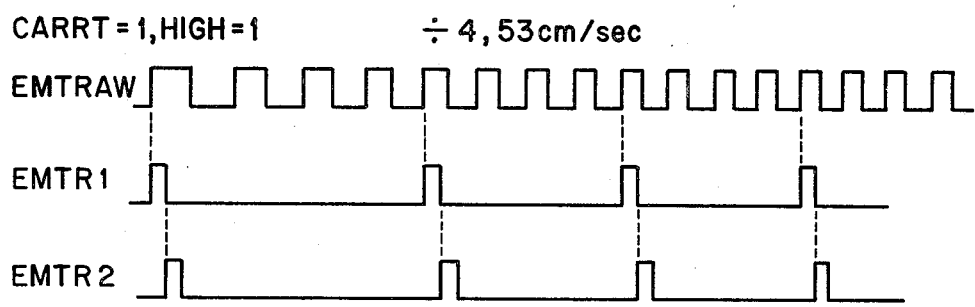

Assume the following conditions: that the carrier 11 is in motion, and the escapement input latch B has received the appropriate signals from, for example, the detection circuit disclosed in patent application, Ser. No. 920,306 filed on June 28, 1978 now U.S. Pat. No. 4,180,704; that the appropriate velocity data has been fed into the escapement input latch B to determine the appropriate speed; and an EMTRAW encoder 26 signal is received by the encoder interface G. The escapement input signals also serve to set the divide by N logic H, and depending upon the velocity set, to provide encoder pulses from EMTR1 and EMTR2, substantially as shown in FIGS. 15A–15C. The system clock CK is assumed, for purposes of discussion, to be at 1.25 MHz which, through counter F generates the clock pulses necessary to control the sequence controller A, the comparator E, the counter C, the encoder interface G, and the divide by N logic H. As the sequence controller A receives the encoder pulses, it generates the appropriate signals as illustrated in FIGS. 2, 3 and 4A–4D and as described in the mnemonic glossary, for presetting the counter C with appropriate $\Delta t_0$ information as through PRESET and starts the counter C running with the $\overline{CNTLD}$. The register D, therefore, is loaded with the value of $\Delta t - \Delta t_0$ (EM') upon receipt of the $\overline{REGLD}$ signal. FIGS. 6a and 6b as well as FIG. 7 illustrate respectively the circuitry employed in the counter C and register D while the mnemonic glossary defines the various input signals both as inputs and outputs to and from the counter C and register D.

Figure 8:
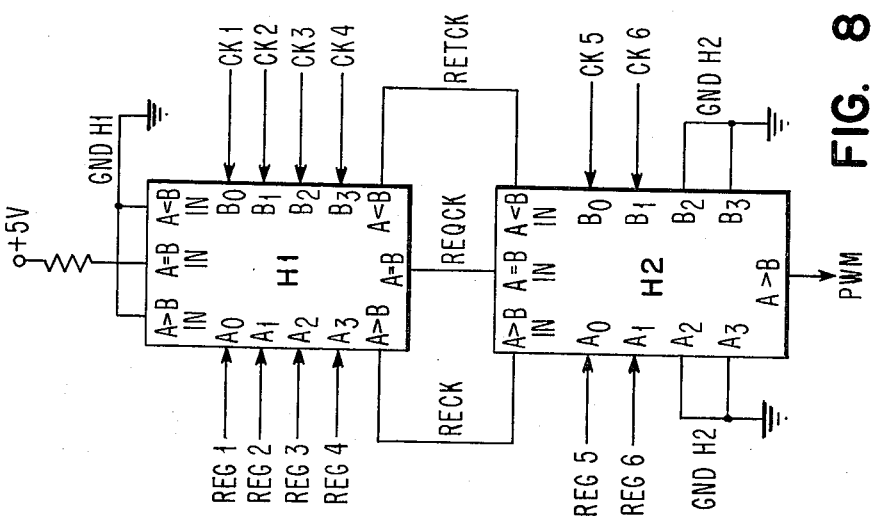
FIG. 8 is a schematic diagram of the comparator E illustrated in FIG. 2.

Comparator E may be considered a "greater than" comparator, and as illustrated in FIG. 8 receives register inputs from register D indicating the difference between $\Delta t$ and $\Delta t_0$. Also as shown in FIG. 8, the magnitude comparators H1 and H2 receive clock input signal CK1–CK6 from counter F. Of course, $\Delta t - \Delta t_0$ is proportional to the value of EM'. In a greater than comparator E or magnitude comparators H1, H2, if the value received from the register D is high for a certain portion of the counts received from the counter F, the output voltage will be modulated in accordance with that porportion. For example, assume that the register D value is 32 and the comparator E has received a count of 64, then the magnitude comparators H1, H2 will allow for a duty cycle of 32 divided by 64 and the pulse width modulated (PWM) signal will resemble a square wave wherein the voltage is high half a cycle and low for half a cycle. The greater the duty cycle, of course, the more energy applied to the motor 25, and of course the faster it will tend to rotate. The pulse width modulated signal (PWM) from the comparator E is applied to a driver interface I which also receives signal inputs from the sequence controller A, as set forth in the mnemonic glossary, to generate by the logic circuitry illustrated in FIG. 16 drive signals for the drive electronics 40 illustrated in FIG. 19.

Figure 19:
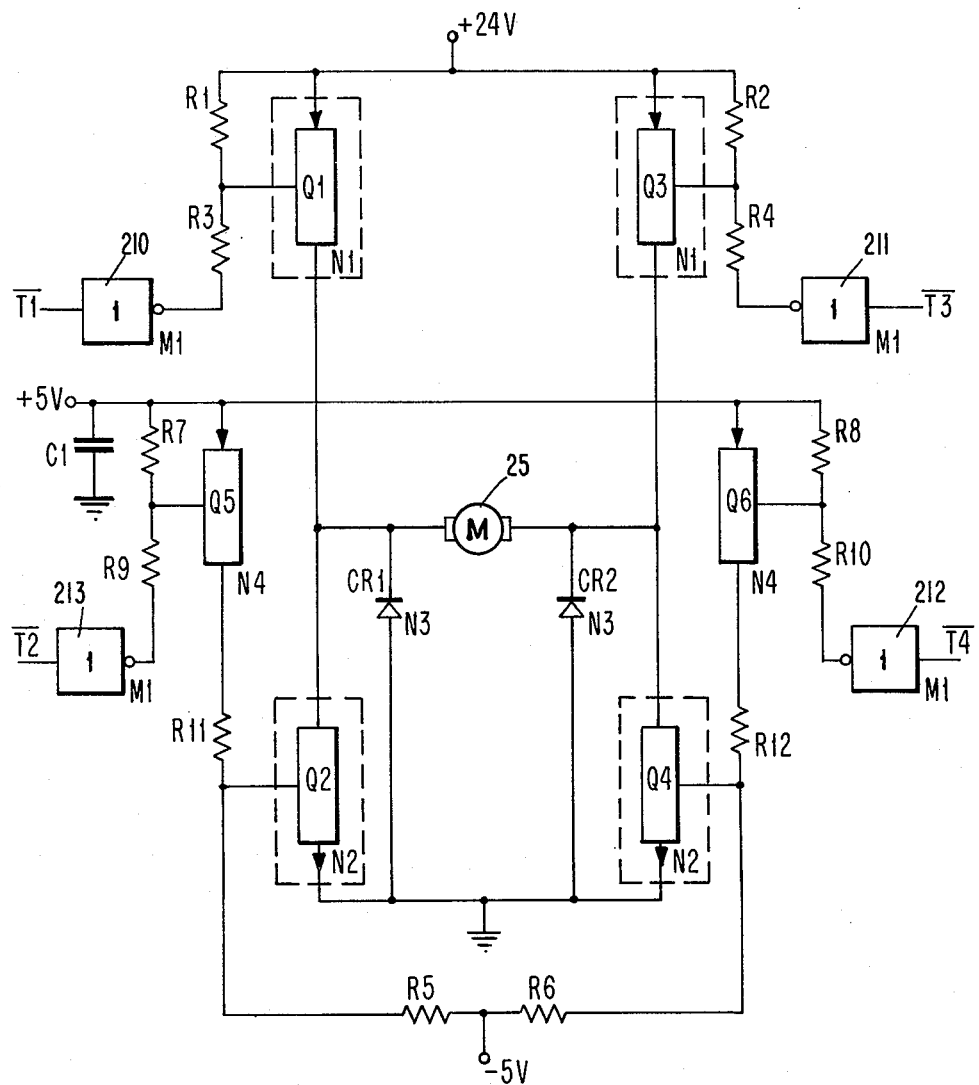
FIG. 19 is an H drive circuit diagram which receives its output from driver interface I for driving the motor illustrated in FIG. 1.

The driver electronics 40 for the motor 25 is preferably of the switching power type, in the illustrated instance and as shown in FIG. 19, the drive electronics 40 is arranged in an H-drive configuration. The H-drive 40 is operated in the limited unipolar mode, the NOT inputs from the driver interface I being $\overline{T1}$-$\overline{T4}$ drive signals, which are applied to the bases of Q1, Q2, Q5 and Q6 through inverters 210–213 (type M1, FIG. 18) respectively. In the H-drive mode, to obtain a positive motor voltage, transistor Q1 (type N1, FIG. 18) is switched at 19.53 KHz while transistor Q4 (type N2, FIG. 18) is turned on. Transistors Q2 and Q3 are turned off. Diode CR1 acts as a catch diode when transistor Q1 is off. To obtain a negative motor voltage, transistor Q3 is switched at 19.53 KHz while transistor Q2, Q1 and Q4 are turned off. Because of the circuit design, there is a 20 microsecond delay time during voltage direction change when all of the transistors Q1–Q4 are turned off. The inherent diodes of the darlington transistors Q1 and Q3, in that instance are used as catch diodes during the transistion period. Transistors Q5 and Q6 are used to allow a −5 volt turn off voltage for transistors Q2 and Q4.

It should be noted that there are other possible operating modes, some of which may be found in the article "Design and Analysis of Pulse Width Modulated Amplifiers for DC Servo Systems", Jacob Tal, IEEE Transactions On Industrial Electronics and Control Instrumentation, Feb. 1976. Moreover, while the motor 25 may be of any conventional type, it may comprise a DC Pittman motor with M-6 magnets, ball bearings and a 24 volt winding.

Start-Up Mode

After the last escapement function has been completed, a new escapement function may be applied to the control system 30, as by an escapement input to the escapement input latch B. In the start up mode, a ramp voltage is generated on top of an initial step voltage in order to get the motor 25 up to a predetermined speed and allow it to operate in the manner heretofore described. The reason for the use of a ramp voltage on top of an initial step voltage is because the encoder pulse rate (sample rate) is initially too slow at low velocities for accurate velocity information. In this connection, when the motor 25 is close to the desired speed, the control system 30 switches to the approximate non-linear velocity control mode as described above for controlling print velocity. In the sample system described, and as set forth both in the drawing and in the mnemonic glossary heretofore set forth, the ramp voltage comprises incrementing the voltage by 0.375 volts every 3.28 msec. The initial step voltage is 1.5 volts for the 12 cm/sec. speed, and 6 volts for velocities V1 and V2 or 25 and 53 cm/sec. respectively. As set forth, in the start up mode the system operates open loop, the step and ramp start up being chosen because of its simplicity and because it guarantees achievement of the desired velocity with maximum relative stability to inhibit hunting of the motor 25 upon reaching its desired velocity.

During the start up of the motor 25, the motor speed is monitored by counting the time between encoder pulses. When the motor 25 reaches a speed close to the desired velocity, the control system 30 is switched to the approximate non-linear velocity control, described heretofore. By way of example, the switching occurs at the following velocities; at the approximate speed of 12 cm/sec., switching occurs at 11.074 cm/sec. (92%), at 25 cm/sec., switching occurs at 20.78 cm/sec. (83%), and at 53 cm/sec., switching occurs at 44.45 cm/sec. (84%).

The start up ramp mode may be easily seen from the mnemonic glossary as well as FIGS. 6B and 6A for the generation of the necessary signals to effectively ramp the counter (register D) and the voltage until the predetermined switching point. For example, the signal output from counter C, CLT 12 will be high when the counter C value is less than 12. This means that the time between the emitter pulses is less than the preset value, which in the instance of the speed $V_0$ is 48, plus the 12 which is added due to the counter value. This condition will remain for that value (48+12) times 12.8μ sec. at which point switching will occur. The same is true for CLT 24, for speed $V_1$, and $\overline{CB6}$ for speed $V_2$. Additionally, with regard to register D, the signals CB3H is employed as an input for loading that register O with the ramp start up when the speed is $V_0$, while CB5H is used with a ramp start up when the speed is $V_1$ and $V_2$.

Thus in the start up mode, the escapement function is started by applying a ramp voltage on top of a step voltage until the motor 25 reaches a speed close to the desired velocity at which time the control system 30 is switched to the approximate non-linear velocity control described heretofore.

Control Braking Mode

The control braking mode has two principle functions: (1) the application of a braking voltage which is proportional to the motor velocity, and (2) detection of the stopping velocity. In order to generate the braking voltage a fixed pulse of braking voltage is applied after receiving each encoder pulse. Mathematically the average voltage applied to the motor 25 may be given by: (1): $EM = -(t_{on}/\Delta t) E$ brake, where: $EM$ = motor voltage; $t_{on}$ = voltage on time $\Delta t$ = time between encoder pulses. Given: $V = \Delta x/\Delta t$ where $V$ = motor velocity $\Delta x$ = distance between encoder pulses therefore: $EM = -(t_{on})(E \text{ Brake}/\Delta x) V$. The form of the above equation, as may be seen, is the same as the analog type 0, control system function equation given heretofore. That function is given by: $EM = -K (V - V_0)$ where $V$ = motor velocity, $V_0$ is equal to the desired velocity, K equals a gain constant; by setting $V_0$ equal to 0: $EM = -K (V)$ thus the effective gain of the digital system is: $K = (t_{on})(E \text{ Brake}/\Delta x)$.

This is true only for the time period that the sample rate is sufficiently high to allow for correct averaging by the system. At lower sample rates, i.e., as the encoder 26 slows down, the response will vary. Therefore, it is preferable to detect the low velocity at which the method of braking may be discontinued, or stated in another way to detect having reached a desired velocity.

Referring to FIG. 2 and the mnemonic glossary, the detection of the reaching of the predetermined or desired velocity is accomplished by the CEND (decode 2) signal. As described in the mnemonic glossary the CEND or decode 2 signal becomes high when the counted time is greater than $t_{final}$. Thus when the motor velocity becomes less than $V_{final} = \Delta x/t_{final}$ then the breaking function ceases.

This function is implemented by resetting counter C each time an encoder phase is received. Once again from the drawing, FIG. 2 et seq, and the mnemonic glossary, $\overline{CB6}$ (decode 1) is high when the counted time is less than $t_{on}$. CEND or decode 2 on the other hand is high when the counter time is greater than $t_{final}$. Thus register D is loaded with the braking voltage. These signals in conjunction with the sequence controller A and the driver interface I generate the correct motor voltage for braking. The $t_{on}$ used is 0.4096 msec. and the braking voltage is minus 6 volts. The effective gain used for braking are kept low at higher velocities to avoid large brake currents. The $t_{final}$ is 6.96 msec., and accordingly the stop velocities are 1.22 cm/sec. for 12 cm/sec. velocity; 2.4 cm/sec. for 25 cm/sec., and; 4.8 cm/sec. for 53 cm/sec. velocity. Thus the effective gain utilized for braking is 70 mv/rad sec.$^{-1}$ for 12 cm/sec., 35 mv/rad sec.$^{-1}$ for 25 cm/sec. and 17 mv/rad sec. for 53 cm/sec.

DETAILED CIRCUIT DESCRIPTION

Figure 4C:
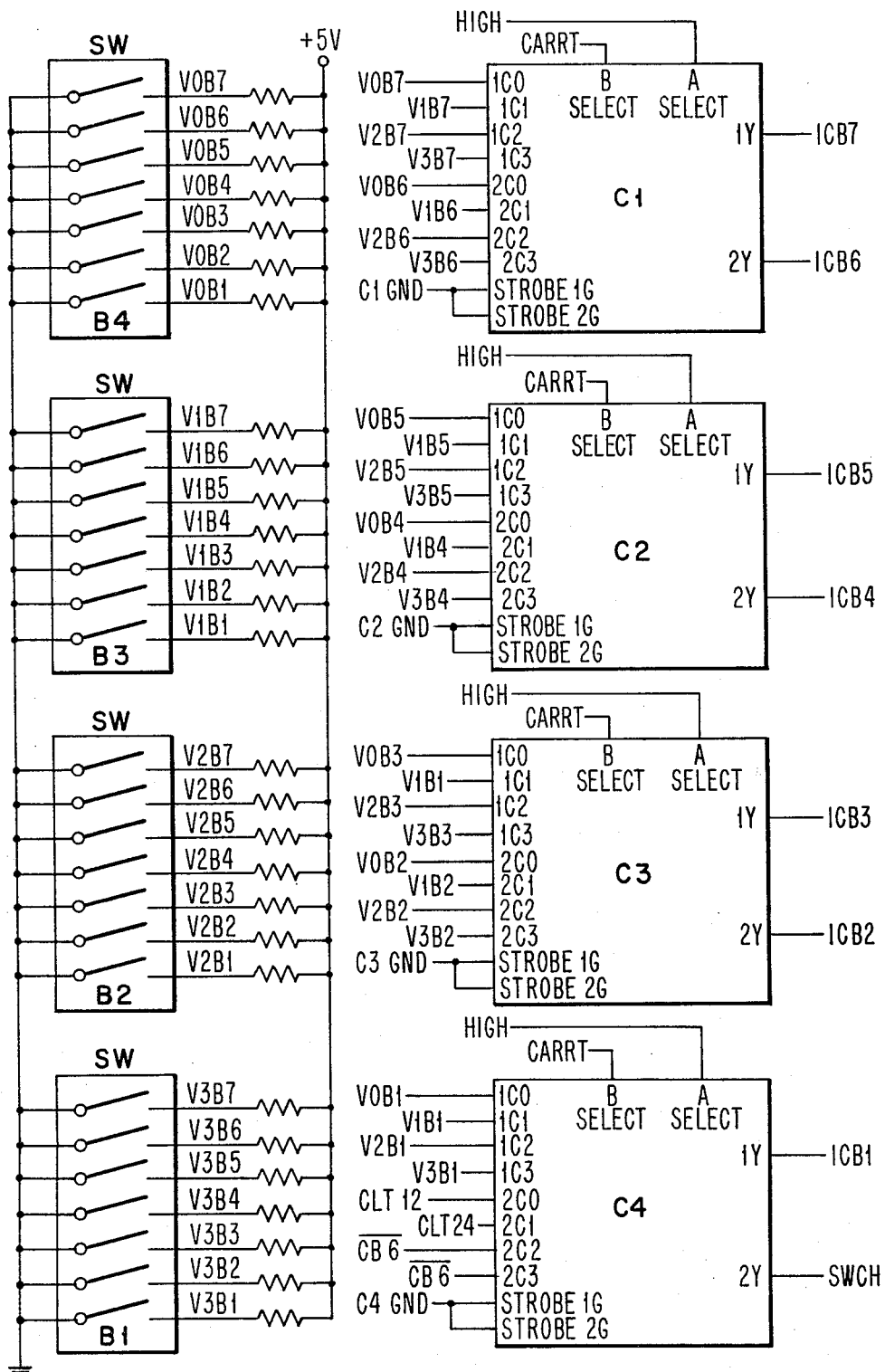

Referring first to FIG. 3, the three bit digital numbers in the upper lefthand corners or sections 100a-104a of boxes 100-104 are representative of the output states of the sequence controller A, the logic circuits being illustrated in FIGS. 4A-4C and more particularly of the state of the flip flops 106, 107 and 108 shown in FIG. 4A. This digital representation is of the outputs S1, S2 and S3 respectively. Thus the blocks 100-104 in FIG. 3 represent the logic equations relating to the system during the system state indicated by the digital bits at sections 101a-104a and designated by the headings appearing in sections 101b-104b of the blocks 101-104 respectively. Thus the idle state given in block 100 in FIG. 3, for example, the state of the flip flops 106-108 in FIG. 4A is given by the three bit digital representation of 000 indicating all outputs are down. When all flip flops 106-108 are down, the equations in the block 100 apply. Of course reference must be made to the mnemonic glossary wherein the inputs and outputs set forth within the blocks 100-104 are defined. With regard to the other states of the flip flops 106-108 and in the sequential logic diagrams shown in blocks 100-104, in section 101a, S1=0, S2=0 and S3=1; in section 102a the state of the flip flops 106-108 is such that S1 is 0 while S2 and S3 are both 1; in section 103a the state of the flip flops 106-108 in such that S1 is 0 while S2 is up or 1, and S3=0, and; in section 104a S1 is up or 1 while S2 and S3 are down in the flip flops 106-108. However, it is emphasized that with the logic equations and the conditions set forth in the blocks 100-104 and the mnemonic glossary to indicate inputs and outputs, any person skilled in the art of logic design will be able to implement the system described heretofore whether it be in discrete devices, microprocessor implementation or even programmable logic arrays (PLA's). Moreover, it should be noted, that the "state conditions" illustrated in the sections 100a-104a pertains to this logic implementation only and that those states could be changed along with a commensurate change in circuits to still obtain the results by employing the logic equations contained within the boxes 100-104. The logic changes from one state block to the next when the logic equation connecting the two blocks is satisfied. By way of example only, in order to progress from the idle state to the ramp start state, i.e. from the sequential logic block 100 to the sequential logic block 101, the conditions of $\overline{STOP}$ and CEND must be met. After these conditions are met then the logic equations appearing in the block 101 and entitled in section 101b "Ramp State" becomes the determining equations.

As is standard in the art, and referring now to FIG. 4A, the flip flops 106-108 have various labelled inputs and outputs. By way of convention in the art, and just by way of example considering the output S2 from flip flop 107, the J input which sets the flip flop 107 is the signal S2J. Conventionally in the art, the signals are labelled by the output of the device, thus "S2" of the portion of the input signal S2J, the J portion of the signal indicating the input to the flip flop 107 to which the signal S2J is applied. Accordingly, in FIG. 4A, wherein a pair of AND gates 109 and 110 as well as an NOR gate 111 and a NAND gate 112 are provided, the signal outputs from those various gates 109-112 can be identified with the appropriate inputs of the flip flops 106-108 respectively. With regard to the previous example, and just by way of example, the NOR gate 111 and NAND gate 112 have their outputs S2JA and S2JB connected to the input of an NAND gate 113 to derive the signal S2J, which becomes an input to flip flop 107. Once again it is emphasized that this is standard terminology, recognizable by those skilled in the art of logic design. With regard the remainder of FIG. 4A, it comprises AND gates 114, 115 which have outputs to an OR gate 116, once again providing an input from the output of OR gate 116, for example, to the K input (reset input) of the flip flop 107 which has an output S2, and thus the output signal S2K of OR gate 116. The signal generation circuit which comprises the implementation of the logic equations found in blocks 100-104 is illustrated also in FIG. 4A and includes a pair of NAND gates 117, 118 respectively and an AND gate 119 to provide the signal out as illustrated in the drawing.

FIG. 4B is a continuation of the logic circuitry required to implement the equations listed in blocks 100-104 of FIG. 3. In FIG. 4b, is illustrated a plurality of NAND gates 120-123 as well as a plurality of AND gates 124-130 as well as OR gates 131, 131, NOR gate 133 and inverters 134 and 135. As an example of the operation of the logic circuitry illustrated in FIG. 4B, consider the output of NOR gate 133, i.e. output CGE32 comprises the S2 output from flip flop 107 as an input, the S3 output from flip flop 108 as an input, and a third input $\overline{CB6}$ from counter C, which generates a logic function or equation wherein CGE32 = $\overline{CB6}$, S2, S3 NOR'D. By definition of a NOR gate, if S2 or S3 is a 1, then CGE32 is a 0. This is verified by an examination of FIG. 3 wherein in any of the sections 100a-104a if either S2 or S3 is=1, CGE32 will be equal to 0. This appears for example, in blocks 101, 102, 103 while it does not appear in blocks 100 or 104. As a matter of fact, when examining blocks 100 and 104, it should be noted that CGE32 is set equal to CB6. Referring back to FIG. 4B again and NOR gate 133 specifically, when neither S2 or S3 is a 1, CGE32 is equal to CB6 (because of inversion of the input signal which was, in that case, $\overline{CB6}$). Other signals as outputs from either NAND gate 121, AND gates 124, 125, 126, 127, 128 and 129 or OR gate 132 may be similarly derived with respect to its inputs and the logic equations set forth in the blocks of the sequential logic diagrams of FIG. 3.

Referring now to FIG. 4C, of the sequence controller A, blocks C1–C4 are multiplexer integrated circuits having inputs carry (CARRT) and HIGH (see mnemonic glossary) and outputs 1CB1–1CB7 and inputs derived from the bank of switches B1–B4. Thus based upon the state of CARRT and HIGH as inputs to the multiplexers C1–C4, one bank of switches B1–B4 is connected to the output 1CB1–1CB7. For example, if both CARRT and HIGH are zeros, then the switch bank B4 is connected to the output 1CB1–1CB7. In other words 1CB7 becomes equal to the value of V0B7, and 1CB6 becomes equal to the value of V0B6 etc. If both HIGH and CARRT were digital 1's, then switch bank B1 is selected, switch value V3B3 then would be reflected as 1CB3, and switch value V3B2 would be reflected as 1CB2 etc. Similarly, multiplexer C4 selects one of the four signals CLT12, CLT24, $\overline{CB6}$ to be reflected or transmitted as the switch output, the SWCH signal appearing in FIG. 3 to effect switching from sequential logic block 101 to sequential logic block 102.

Figure 4D:
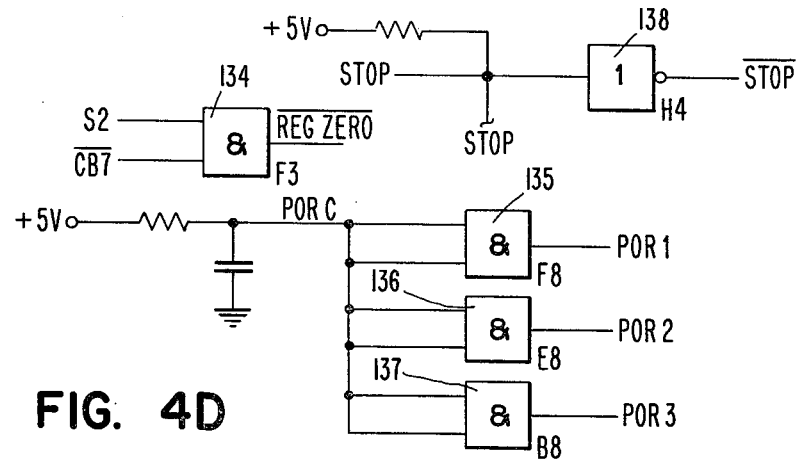

FIG. 4D is a continuation of the Sequence Controller A logic circuitry and includes a plurality of AND gates 134–137 as well as a signal inverter 138. As noted, the conventional power on reset (POR) logic is provided by the power supply for setting various portions of the logic to its initial or initialized state.

Figure 5:
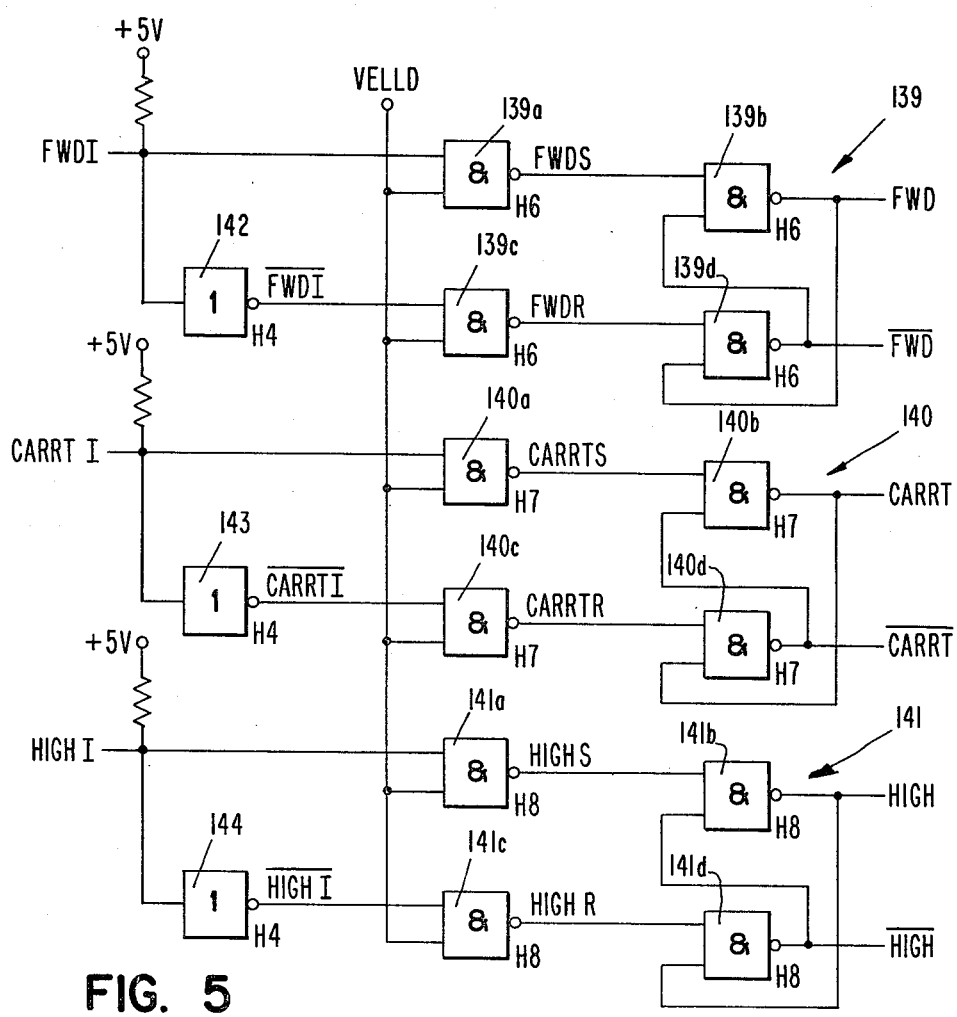
FIG. 5 is a schematic diagram of the escapement input latch B illustrated in FIG. 2.

FIG. 5 depicts the Escapement Input Latch B logic circuitry which latches the three inputs FWDI, CARRT I and HIGH I to provide the outputs depicted at the righthand portion of the circuitry, notably forward (FWD), $\overline{FWD}$, CARRT, $\overline{CARRT}$, HIGH and $\overline{HIGH}$. The four NAND gates 139a–139d form a conventional RS latch (set/reset) 139 as do the four NAND gates 140a–140d and 141a–141d form RS latches 140 and 141. The input signal VELLD acts to enable each of the RS latches 139–141 while the inputs heretofore described act through inverters 142, 143 and 144 to give the $\overline{SIGNALS}$ of the inputs FWD I, CARRT I, and HIGH I to the respective NAND gates 139a–141d of the latches 139–141.

FIGS. 6A and 6B are logic circuits employed in the counter C, which receives inputs from the clock counter F and the Sequence Controller A and provides outputs to the Sequence Controller A and through output signal CB1–CB7 to the Register D (FIG. 2). D1 and D2 are loadable 4 bit counters which are cascaded to form an 8 bit counter. Input $\overline{CNTLD}$ from NAND gate 118, FIG. 4A, causes the counters D1, D2 to be preset to the values defined by the values 1CB1–1CB7 which are outputs of the multiplexers C1–C4 illustrated in FIG. 4C. The outputs of the counters D1, D2 (CB1–CB7) are fed back to an 8 high NAND gate 145 having an output $\overline{CEND}$ which is applied to a pair of NAND gates 146 and 147, the NAND gate 146 having a clocking output CCK to the cascaded counters D1 and D2. The signal CEND signifies that the counter D1, D2 is full and ready to overflow. The signal $\overline{CEND}$ disables the clock NAND gate 146 to inhibit counter overflow. The NAND gates 148 and 149 with inputs CGE32 and $\overline{CGE32}$ in conjunction with the clock input CK4 and CK8 operate in conjunction with NAND gate 150 to change the clock rate to an output CCKA which provides a second input to NAND gate 146 for clocking the counter D1 and D2.

FIG. 6B is also part of the counter C circuitry and includes four inverters 151, 152, 153 and 159; a pair of OR gates 154, 155 and three AND gates 156, 157 and 158. With the inputs to the circuitry illustrated in FIG. 6B, i.e. input CGE32, CB3–CB7, the outputs CLT24, $\overline{CLT12}$ as well as CLT12 are provided, as well as the outputs $\overline{CB6}$, $\overline{CB7}$ and $\overline{CGE32}$. Basically the circuit of FIG. 6B is a decode circuit, for the outputs CB1–CB7.

FIG. 7 illustrates typical logic circuitry which may be employed for the Register D, illustrated in FIG. 2, and includes presettable counters F1 and F2 which serve the function of a register which can be incremented. The signal REGLD is used to load the counters F1 and F2 with the values of CMB1–CMB6 in order to provide the outputs REG1–REG6. The inputs CMB1–CMB6 to the presettable counters F1 and F2 are provided by the outputs from a plurality of AND gates 160–165 which receive their inputs from $\overline{REG\ ZERO}$ and the outputs CB1–CB6 from the counters D1 and D2 of FIG. 6A. As shown, AND gates 163 and 165 have outputs CMB3A and CMB5A respectively which are provided as inputs to OR gates 166 and 167 along with outputs CB3H and CB5H from the Sequence Controller A (see output of AND gate 127 and OR gate 132 in FIG. 4B), to form the inputs CMB3 and CMB5 into the presettable counters F1 and F2. Input REG CK (from NAND gate 122, FIG. 4B) to the presettable counters F1 and F2 is employed to increment the counters F1, F2, the output $\overline{REG\ ZERO}$ (from AND gate 134, FIG. 4D) performs the function of initializing the outputs of the AND gates 160–165 to zero so that the counters F1, F2 are preset to zero.

FIG. 8 is a schematic diagram of the comparator E, and comprises a pair of magnitude comparators H1 and H2 which compares the digital values represented by signal inputs REG 1–REG 6 to the digital values represented by clock signals CK1–CK6 to provide a pulse-width modulated output (PWM) in accordance with the invention. It will be recognized of course by one skilled in the art that the REG 1–REG 6 values and the clock signal CK1–CK6 are both 6bit binary numbers.

Figure 9:
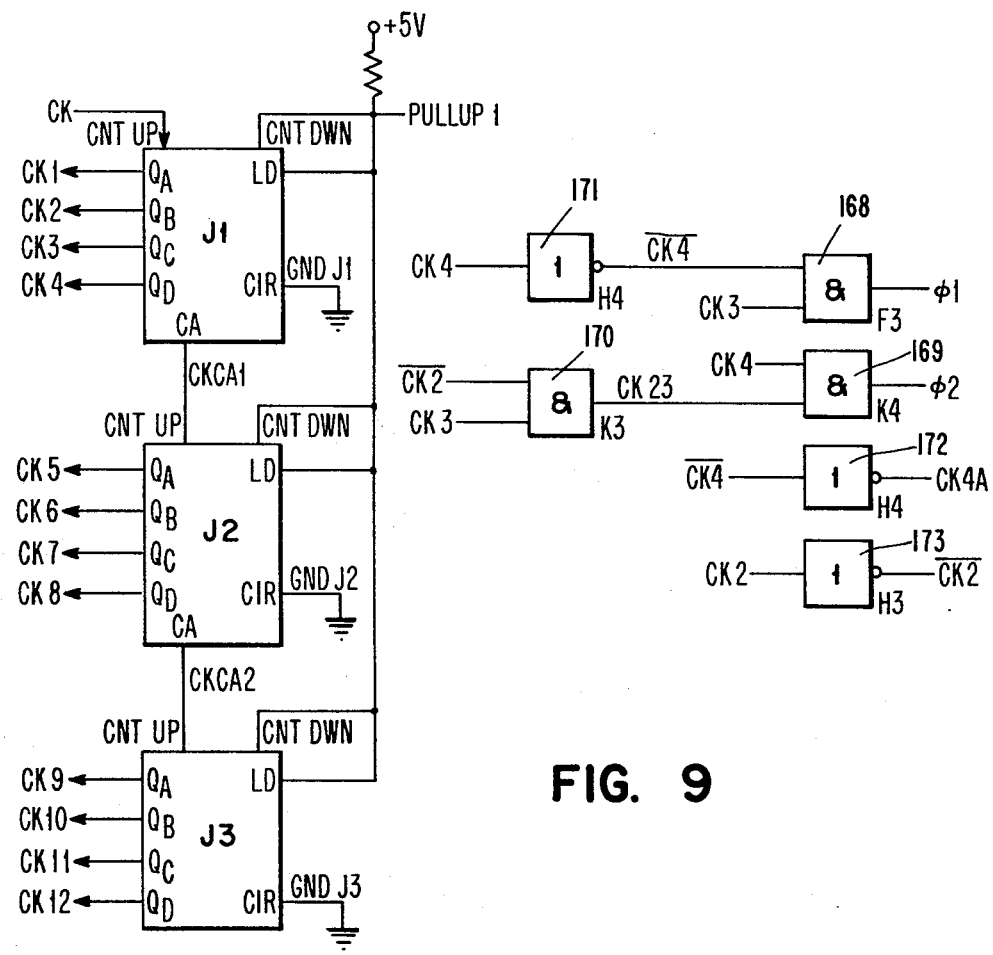
FIG. 9 is a schematic diagram of the circuitry comprising counter F illustrated in FIG. 2.

FIG. 9 is a schematic representation of the circuitry comprising the Counter F illustrated in FIG. 2. The circuitry comprises three four bit counters J1–J3 forming a 12 bit counter to which is applied a master clock signal CK, the counters J1–J3 dividing the master clock signal to form the clock signals CK1–CK12. The inputs from the counter F (FIG. 2) to the Sequence Controller A, i.e. $\phi1$, $\phi2$, CK4 and $\overline{CK2}$ are provided by the logic circuitry comprised of three AND gates 168, 169, 170 and three inverters 171–173 respectively. As shown, the AND gate 170 is provided with an input $\overline{CK2}$ and CK3 to provide an output CK23 which acts as an input to AND gate 169 to give the clock signal $\phi2$. Clock signal $\phi1$ is derived in a similar manner from $\overline{CK4}$ and CK3 through AND gate 168.

Figure 10:
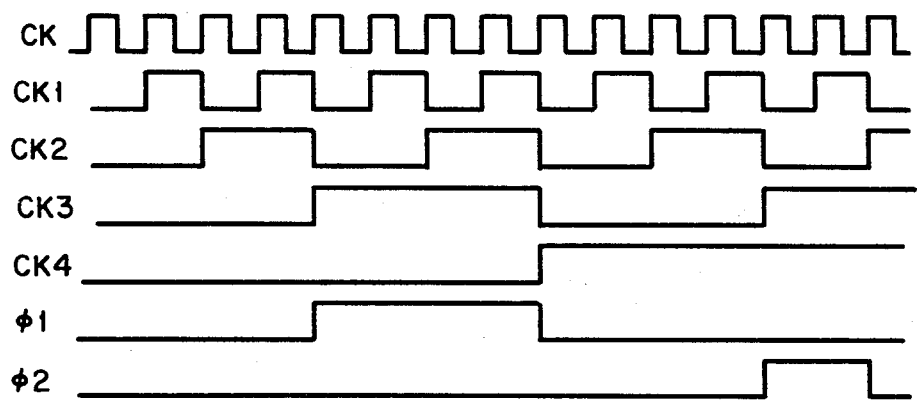
FIG. 10 is a timing diagram of the outputs from counter F schematically illustrated in FIG. 9 and shown in block diagram in FIG. 2.

FIG. 10 shows the timing diagram of the outputs from the counter F schematically illustrated in FIG. 9 and shown in the block diagram of FIG. 2.

Figure 11:
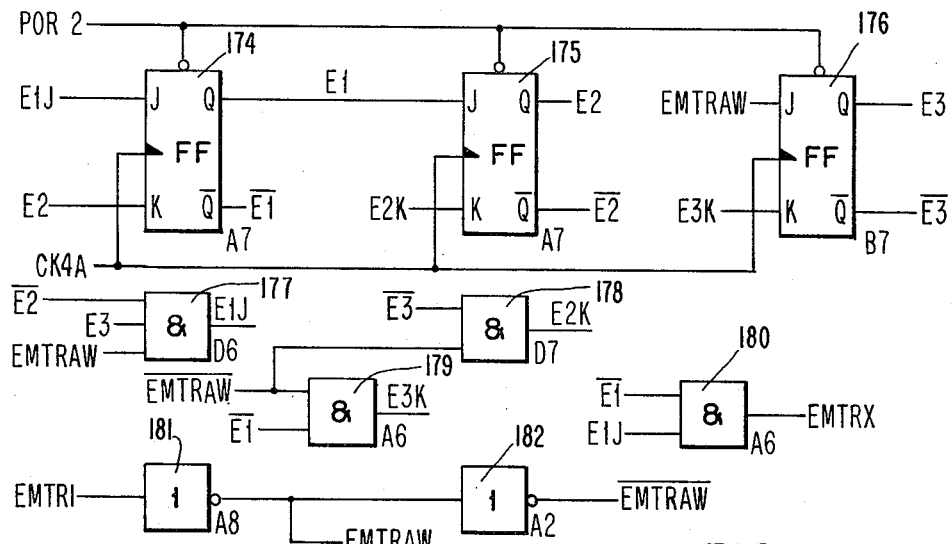
FIG. 11 is a schematic circuit diagram of the encoder interface G illustrated in FIG. 2.
Figure 12:
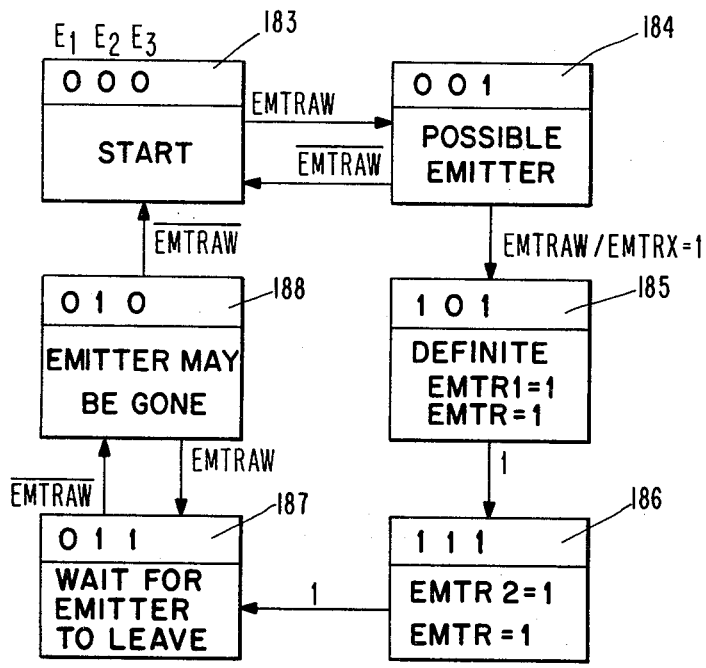
FIG. 12 is the encoder G interface state (sequential logic) diagram.

FIG. 11 is a schematic circuit diagram of the encoder interface G illustrated in FIG. 2, and includes JK flip flops 174, 175 and 176 along with AND gates 177–180 as well as inverters 181 and 182. As shown in FIG. 9, CK4A and CK4 are identical signals (logically equivalent) and CK4A is provided as a clock input to the JK flip flops 174–176. The AND gates 177–180 and the inverters 181 and 182 generate the signals for setting and resetting the flip flops 174-176, as defined in the sequential logic diagram for the Encoder G interface in FIG. 12. As shown in the state conditions of FIG. 12, the states of the signals E1, E2 and E3 (from the flip flops 174-176 respectively) is illustrated in the blocks 183-188 as to their digital values. The outputs which are generated from the AND gate 180 is EMTRX which is employed as an input to the divide by N ($\div$N) logic H illustrated in FIG. 2. From the state diagram or sequential logic diagram of FIG. 12, EMTRX is equal to 1 when moving from block 184 to 185 to ENTRAW is equal to 1. The function of the logic of FIG. 11 is to provide a rising leading edge pulse which is a clock cycle wide as in input to the logic ($\div$N, block H) illustrated in FIG. 13. Other inputs provided for the logic in FIG. 13 are the outputs E1 from flip flop 174 and the outputs E2 and $\overline{E2}$ from the flip flop 175.

Figure 13:
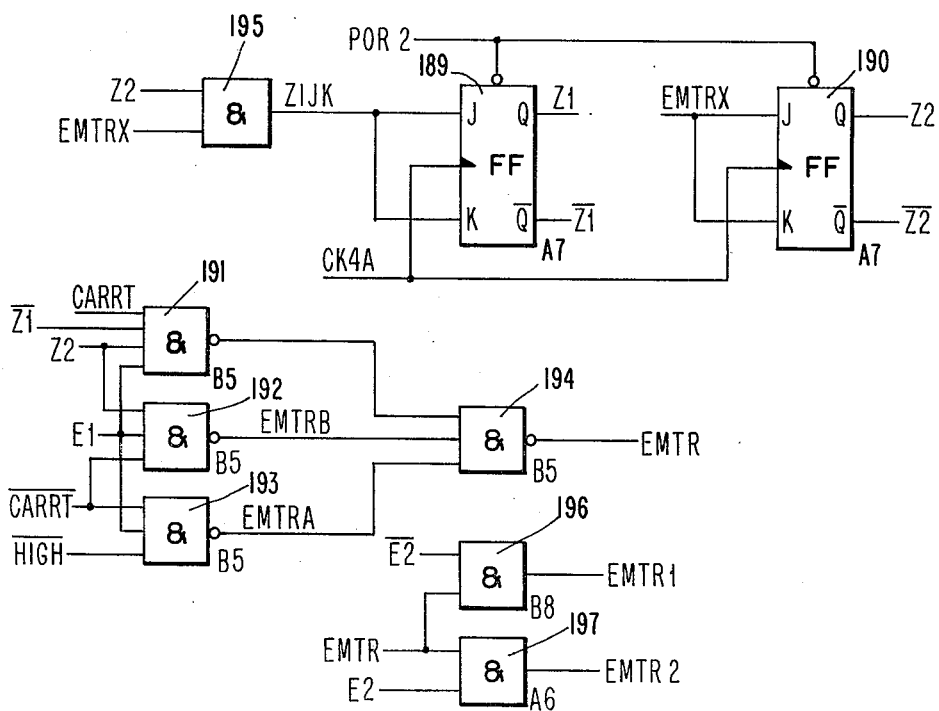
FIG. 13 is a schematic circuit diagram of the ÷N logic H illustrated in FIG. 2.
Figure 14:
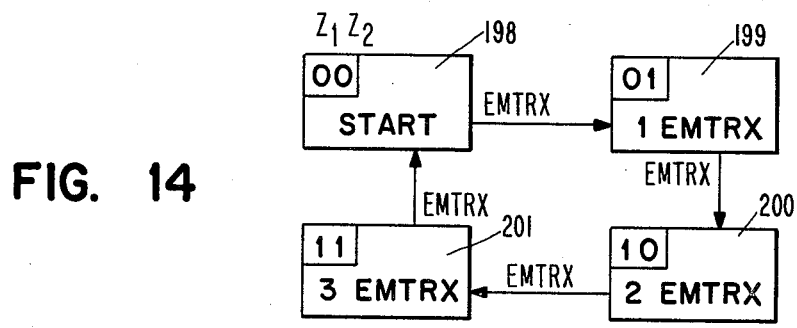
FIG. 14 is a ÷N state (sequential logic) diagram indicating the states of the circuitry illustrated in FIG. 13.

Referring now to the divide by N ($\div$N) logic H circuit illustrated in FIG. 13, this circuit comprises flip flops 189 and 190 as well as NAND gates 191-194, and AND gates 195-197. The sequence logic diagram for the flip flops 189 and 190 of the divide by N ($\div$N) logic H is illustrated in FIG. 14 where Z1 and Z2 are outputs respectively of the flip flops 189, 190 (FIG. 13). The logic states are illustrated in the upper lefthand corners of the blocks 198-201 and represent the states of the outputs Z1 and Z2 of the flip flops 189, 190. The NAND gates 191-194 and the AND gates 196 and 197 are employed to produce the signals EMTR1 and EMTR2 to the sequence controller A (see FIG. 2 as well as FIG. 4A where EMTR1 is provided as an input to NOR gate 111 and both FIGS. 4A and 4B wherein EMTR2 is provided as an input to NAND gates 117 and 120). The input CARRT, $\overline{CARRT}$ and $\overline{HIGH}$ define the output of EMTR1 and EMTR2 as described in FIGS. 15A-15C. For example, when CARRT equals 0, and HIGH equal 0, EMTR1 is a pulse which occurs on the rising (leading) edge of every EMTRAW signal, while when CARRT equals 0 and HIGH equals 1, the EMTR1 signal occurs every other cycle of the EMTRAW signal and when CARRT equals 1 and HIGH high equals 1 then EMTR1 occurs on every fourth EMTRAW signal.

Figure 16:
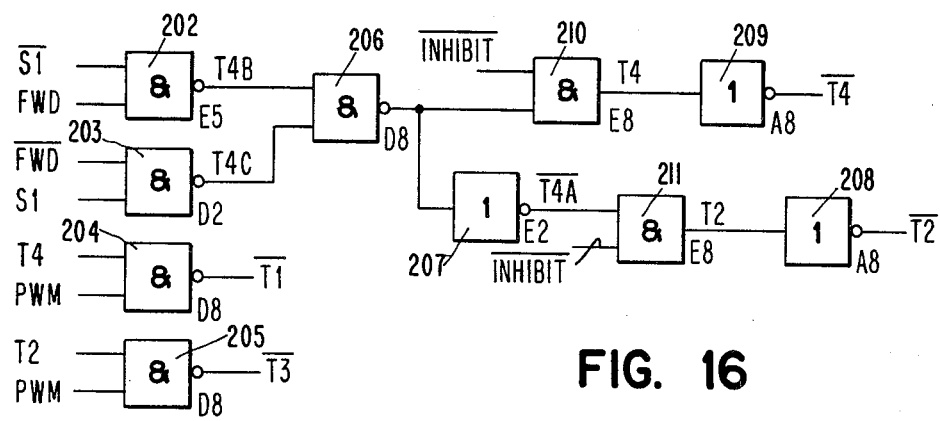
FIG. 16 is a schematic diagram of the driver interface logic I illustrated in FIG. 2.

FIG. 16 is the Driver Interface I logic circuitry illustrated in FIG. 2. This circuitry comprises five NAND gates 202-206, three inverters 207-209 and a pair of AND gates 210 and 211 connected as illustrated in the drawing. The inputs to the Driver Interface I are as shown in FIG. 2, and 16 and include S1, $\overline{S1}$ as generated by the flip flop 106 in FIG. 4A, the $\overline{INHIBIT}$ as generated by the AND gate 128 in FIG. 4B, and the PWM signal from the magnitude comparators H1 and H2 (FIG. 8). This provides the Driver Interface I output signal $\overline{T1-T4}$.

Figure 17:
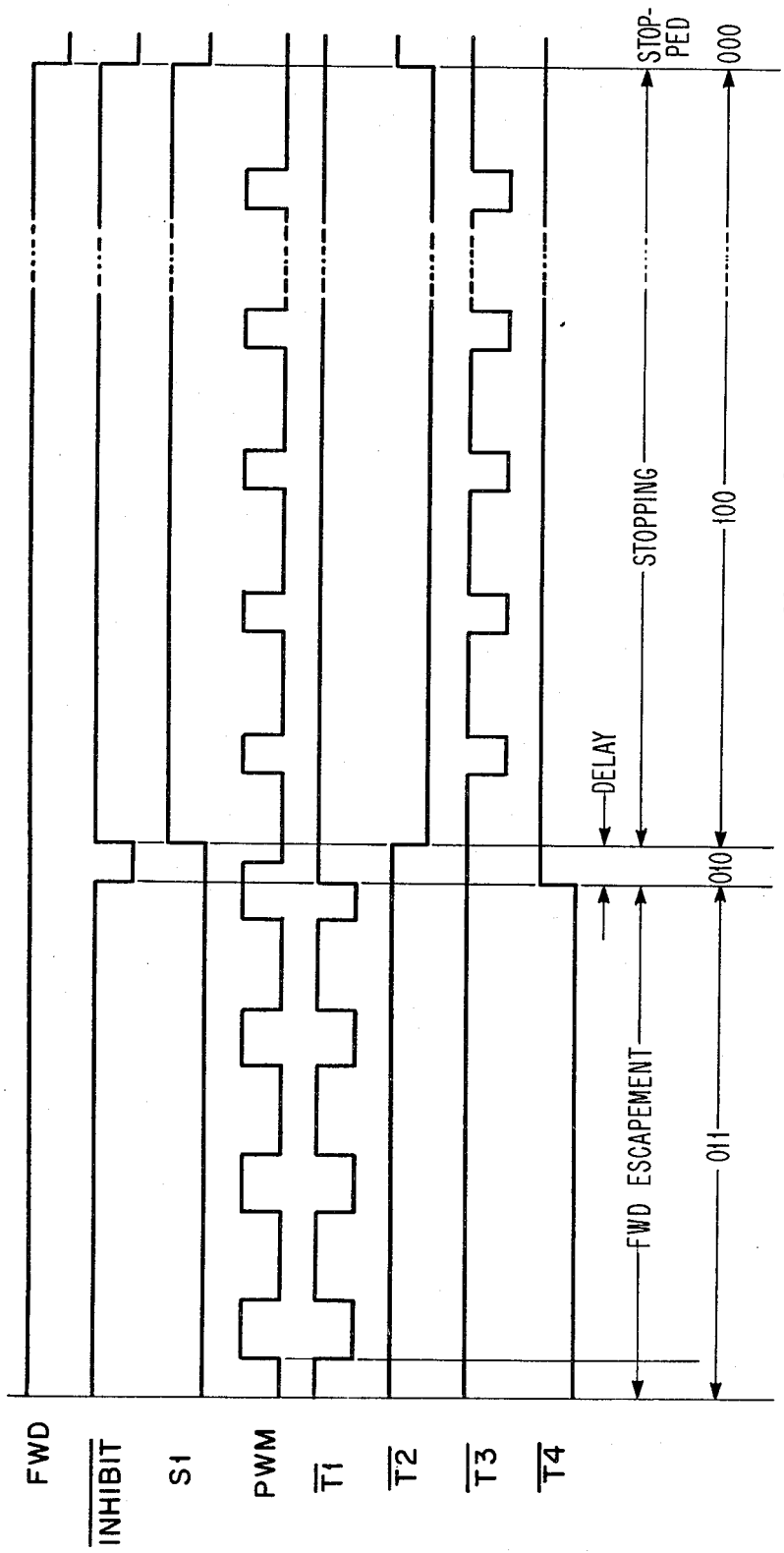
FIG. 17 is the driver interface logic I timing diagram.

FIG. 17 is the Driver Interface I logic timing diagram with the signals heretofore described relative to FIG. 16, and in the state conditions illustrated in the sequence controller A sequential logic diagram illustrated in FIG. 3.

In FIG. 18 is set forth a chart which gives typical devices and values which may be employed in the circuit diagrams illustrated in FIGS. 4-16 to accomplish the results heretofore described. The manner of utilizing this chart is obvious from an examination of the drawing. A few examples are given hereinafter to enable one to utilize the drawing and pick out the proper device so that the circuitry accomplishing the result described may be obtained. Referring now, for example, to FIG. 4A, adjacent each of the flip flops 106-108 is a number and letter, in the example of flip flop 106 a letter and number designation "E7", in the case of flip flop 107 "E7", and flip flop 108 carries a designation "F7".

Referring now to the chart set forth in FIG. 18, to the column E and to the row 7, at the intersection of the column and row is a device number "74107" which is a typical JK flip flop manufactured by a number of semiconductor manufacturers. In a similar manner, at the intersection of column F and row 7 is another "74107" device. Additionally, in examination of the AND gates 109 and 110, the designation "F8" appears to the side of those gates and similarly running the table as heretofore described results in a device numbered "74108". The AND gate 114 has a "D6" designation which is a "7411" device, while AND gate 115 has a "K3" designation and is also a "7408". NAND gates 112 and 113 have the designation of "F5" and "E5" respectively, and are 7420 and 7400 devices. Moreover, OR gate 116 in FIG. 4A has a designation of "J4" and is, as designated in the table, a "7432" device. Throughout the drawing, adjacent each of the gates or other devices are similar alphanumeric designations. Moreover, in certain instances, and where convenient, such as in the multiplexer C1-C4, an examination of the table under C1-C4 will indicate that each one of the multiplexers are 74153 semi-conductor devices. The same is true of the designations for the cascaded counters J1-J3 (all 74193 semi-conductor devices) and F1, F2 which are also 74193's, and H1, H2 which are 74L85's. Accordingly, from the circuit diagram set forth herein, and the chart illustrated in FIG. 18, it is a simple matter for even one not skilled in the art to construct the structure to achieve the result heretofore described.

SUMMARY

It should be recognized that the importance of the counter C and register D is that upon the initiation of an encoder pulse, the counter C counts and compares with a preset value which gives a difference that is proportional to the voltage applied or which should be applied to the motor 25 to enable the motor 25 to operate at its predetermined speed, while on the initiation of the subsequent pulse (i.e. the next succeeding pulse from the encoder 26) the register D is loaded with that difference and becomes available as an output which is proportional to that driver voltage necessary to attain the correct speed of the motor 25. In this connection, the output of the register D may be interfaced directly with a voltage to frequency convertor which has an output frequency directly proportional to the input voltage so as to increase or decrease, as the case may be, the rotational speed of, for example, an AC motor. However, the direct controlling, in a manner described heretofore is preferable in connection with a DC motor drive wherein a pulse width modulated signal is derived from that voltage difference for controlling, through a drive circuit, the rotational velocity of the motor 25.

Accordingly, the present invention provides means for accurately controlling the velocity of a motor, particularly for a printer by digital circuitry and enables direct conversion of the digital signal without analog to digital convertor or tachometer techniques for directly controlling the motor speed.

Although the invention has been described with a certain degree of particularlity, it is understood that the present disclosure has been made only by way of example and that numerous changes in the details of construction and the combination and arrangement of parts may be made without departing from the spirit and scope of the invention as hereinafter claimed:

What is claimed is:

1. In a printer having a carrier on which is disposed implements for printing indicia on a print receiving medium, an improved drive system for effecting relative motion between said carrier and said print receiving medium, said drive system comprising;
   a motor operatively connected to at least one of said carrier and print receiving medium to effect relative motion therebetween;
   means for generating a series of pulses having a time interval between adjacent pulses inversely proportional to the speed of said relative motion;
   means for measuring the time interval between adjacent pulses and for subtracting a predetermined time interval therefrom for generating a first digital output signal representative of the difference between the actual time interval between adjacent pulses and said predetermined time interval;
   and means for generating from said first digital output signal a signal output to said motor having a duty cycle directly proportional to said first digital output signal to effect changes in the speed of relative motion.

2. In a printer having a carrier on which is disposed implements for printing indicia on a print receiving medium, an improved drive system for effecting relative motion between said carrier and said print receiving medium, said drive system comprising;
   a motor operatively connected to at least one of said carrier and print receiving medium to effect relative motion therebetween;
   means for generating a series of pulses having a time interval between adjacent pulses inversely proportional to the speed of said relative motion;
   means for measuring the time interval between adjacent pulses and subtracting therefrom a predetermined time interval for generating a first digital output signal representative of the difference between the actual time interval between adjacent pulses and said predetermined time interval;
   comparator means for receiving said first digital output signal and comparing said first digital output signal with a second digital value and for generating a pulsed signal output; and
   means for applying said pulsed signal output to said motor to effect changes in the speed of relative motion.

3. In a printer having a carrier on which is disposed implements for printing indicia on a print receiving medium, an improved drive system for effecting relative motion between said carrier and said print receiving medium, said drive system comprising;
   a DC motor operatively connected to at least one of said carrier and print receiving medium to effect relative motion therebetween;
   means for emitting a series of pulses having a time interval between adjacent pulses inversely proportional to the speed of said relative motion;
   means for measuring the time interval between adjacent pulses and substracting therefrom a predetermined time interval for generating a first digital output signal representative of the difference between the actual time interval between adjacent pulses and said predetermined time interval;
   comparator means for receiving said first digital output signal and comparing said first digital output signal with a second digital value and for generating a pulsed signal output having a pulse width proportional to said first digital output signal; and
   means for applying said pulsed signal output to said DC motor to effect changes in the speed of relative motion.

4. In a printer in accordance with claim 3 wherein said pulsed signal output has a duty cycle proportional to the ratio of said first digital output signal and said second digital value.

5. In a printer in accordance with claim 4 wherein said pulsed signal output has a predetermined frequency.

6. In a printer having a carrier on which is disposed implements for printing indicia on a print receiving medium, an improved DC motor system drive for effecting relative motion between said carrier and said print receiving medium, said DC motor system drive comprising:
   a DC motor having a motor shaft and means coupled to the motor shaft for emitting a series of pulses having a time interval between adjacent pulses inversely proportional to the rotational velocity of said motor whereby the faster the motor shaft rotation, the shorter the time interval between pulses;
   means for subtracting from said time interval a reference time interval and for generating a first digital output signal proportional to the difference between the actual time interval and the reference time interval;
   comparator means for receiving said first digital output signal, and means for generating a second digital signal and applying said second digital signal to said comparator means;
   said comparator means including means for emitting a pulsed signal output having a predetermined frequency and a pulse width proportional to said first digital output signal, and means for applying said pulsed output signal to said DC motor to effect changes in the rotational velocity of said motor shaft.

7. In a printer in accordance with claim 6 including means to alter said reference time interval, to thereby increase or decrease the speed of said motor.

8. In a printer in accordance with claim 6 including means to store said first digital output signal.

9. In a printer in accordance with claim 6 including means for applying a ramp start DC motor voltage until said motor reaches a predetermined percentage of a predetermined motor rotational velocity, and means to monitor said rotational velocity until said percentage is reached.

10. An ink jet printer for printing indicia upon a print receiving medium, said printer comprising:
    a carrier, and a DC motor connected to said carrier for moving said carrier along a predetermined path;
    means disposed adjacent said path for holding said print receiving medium;
    a nozzle for emitting a perturbated stream of ink drops directed towards said print receiving medium, and a charge electrode for charging said ink drops, and deflection electrodes for effecting deflection of said charged ink drops dependent upon the charge thereon;

said nozzle, charge electrodes and deflection electrodes being mounted on said carrier;

means for sensing and determining the position of said carrier, and its direction of movement along said path, and means associated therewith for emitting a series of pulses having a time interval between adjacent pulses inversely proportional to the speed of said carrier along said path;

means for subtracting from the time interval between adjacent pulses a predetermined time interval and for generating a first digital output signal representative of the difference between the actual time interval between adjacent pulses and said predetermined time interval;

comparator means for receiving said first digital output signal and comprising said first digital output signal with a second digital value and for generating a pulsed signal output having a pulse width proportional to said first digital output signal; and means for applying said pulsed signal output to said DC motor to effect changes in the speed of said carrier along said path.

11. An ink jet printer in accordance with claim 10 wherein said pulsed signal output has a duty cycle proportional to the ratio of said first digital output signal and said second digital value.

12. An ink jet printer in accordance with claim 10 wherein said pulsed signal output has a predetermined frequency.

13. An ink jet printer in accordance with claim 12 including means to alter said time interval to thereby increase or decrease the predetermined speed of said carrier along said path.

14. An ink jet printer in accordance with claim 13 including register means to store said first digital output signal.

15. An ink jet printer in accordance with claim 14 including means for applying a ramp start DC motor voltage until said motor reaches a predetermined percentage of a predetermined motor rotational velocity, and means to monitor said rotational velocity until said percentage is reached.

16. A continuous sweep printer, comprising in combination a carrier on which is disposed implements for printing indicia on a print receiving medium, means disposed adjacent said carrier for holding said print receiving medium; a drive system for effecting relative motion between said carrier and said print receiving medium, said drive system comprising;

a DC motor operatively connected to at least one of said carrier and print receiving medium to effect relative motion therebetween;

means for emitting a series of pulses having a time interval between adjacent pulses inversely proportional to the speed of said relative motion;

means for determining the time interval between adjacent pulses and subtracting therefrom a predetermined time interval for generating a first digital output signal representative of the difference between the actual time interval between adjacent pulses and said predetermined time interval;

comparator means for receiving said first digital output signal and comparing said first digital output signal with a second digital value and for generating a pulsed signal output having a pulse width proportional to said first digital output signal; and means for applying said pulsed output signal to said DC motor to effect changes in the speed of relative motion.

17. A continuous sweep printer in accordance with claim 16 including means to alter said predetermined time interval, to thereby increase or decrease the speed of said motor.

18. A continuous sweep printer in accordance with claim 17 including means to store said first digital output signal.

19. A continuous sweep printer in accordance with claim 18 including means for applying a ramp start DC motor voltage until said motor reaches a predetermined percentage of a predetermined motor rotational velocity, and means to monitor said rotational velocity until said percentage is reached.

20. A continuous sweep printer in accordance with claim 16 wherein said printer is of the dot matrix type.

21. A continuous sweep printer in accordance with claim 20 wherein said dot matrix printer is an ink jet printer.

* * * * *